US 9,347,164 B2

(12) United States Patent
Im et al.

(10) Patent No.: US 9,347,164 B2
(45) Date of Patent: May 24, 2016

(54) WASHER

(75) Inventors: Myong Hun Im, Seoul (KR); Sung Min Lee, Seoul (KR); Won Hyuk Jang, Seoul (KR)

(73) Assignee: LG ELECTRONICS INC., Seoul (KR)

( * ) Notice: Subject to any disclaimer, the term of this patent is extended or adjusted under 35 U.S.C. 154(b) by 64 days.

(21) Appl. No.: 14/111,728

(22) PCT Filed: Jan. 16, 2012

(86) PCT No.: PCT/KR2012/000365
§ 371 (c)(1),
(2), (4) Date: Jan. 24, 2014

(87) PCT Pub. No.: WO2012/141407
PCT Pub. Date: Oct. 18, 2012

(65) Prior Publication Data
US 2014/0165664 A1 Jun. 19, 2014

Related U.S. Application Data

(60) Provisional application No. 61/475,653, filed on Apr. 14, 2011.

(51) Int. Cl.
| | | |
|---|---|---|
| D06F 35/00 | (2006.01) | |
| D06F 39/08 | (2006.01) | |
| D06F 37/26 | (2006.01) | |
| D06B 1/08 | (2006.01) | |
| D06F 39/00 | (2006.01) | |
| D06F 33/02 | (2006.01) | |
| D06F 37/30 | (2006.01) | |

(52) U.S. Cl.
CPC ............... *D06F 35/006* (2013.01); *D06B 1/08* (2013.01); *D06F 33/02* (2013.01); *D06F 37/266* (2013.01); *D06F 37/304* (2013.01); *D06F 39/003* (2013.01); *D06F 39/005* (2013.01); *D06F 39/08* (2013.01); *D06F 39/083* (2013.01); *D06F 39/087* (2013.01); *D06F 39/088* (2013.01); *D06F 37/267* (2013.01); *D06F 2202/10* (2013.01); *D06F 2204/065* (2013.01); *D06F 2204/086* (2013.01); *D06F 2214/00* (2013.01)

(58) Field of Classification Search
None
See application file for complete search history.

(56) References Cited

U.S. PATENT DOCUMENTS

| 2005/0028564 A1* | 2/2005 | Lee .................. B05B 1/267 68/24 |
|---|---|---|
| 2005/0144735 A1 | 7/2005 | Yang et al. |
| 2009/0249840 A1 | 10/2009 | Jo et al. |

(Continued)

FOREIGN PATENT DOCUMENTS

| CN | 101024916 A | 8/2007 |
|---|---|---|
| CN | 101824722 A | 9/2010 |
| EP | 1505191 A1 | 2/2005 |

(Continued)

*Primary Examiner* — Michael Barr
*Assistant Examiner* — Cristi Tate-Sims
(74) *Attorney, Agent, or Firm* — Dentons US LLP

(57) ABSTRACT

A washing machine comprises a casing; a tub disposed inside the casing; a drum rotatably provided inside the tub, for accommodating laundry therein; and a spiral nozzle for rotating supplied water in a predetermined direction and then spraying the water into the drum through discharge hole, wherein the spiral nozzle comprises an impingement surface formed in front of the discharge hole so that the water discharged from the discharge hole is distributed by impinging on the impingement surface.

15 Claims, 20 Drawing Sheets

(56) References Cited

U.S. PATENT DOCUMENTS

2009/0277035 A1 * 11/2009 Choi .................. D06F 58/04
34/130
2010/0205753 A1    8/2010  Kim et al.

FOREIGN PATENT DOCUMENTS

| | | |
|---|---|---|
| EP | 1700943 A1 | 9/2006 |
| JP | S63-114670 | 7/1988 |
| JP | 06-335586 A | 12/1994 |
| JP | 2011-169997 | 6/2001 |
| JP | 2005-052754 | 3/2005 |
| JP | 2005-058899 | 3/2005 |
| KR | 100662473 B1 | 1/2007 |
| KR | 10-2010-0106260 A | 10/2010 |
| KR | 10-2011-0011315 | 2/2011 |
| KR | 10-2011-0025566 | 3/2011 |
| WO | 2007-145451 A2 | 12/2007 |

* cited by examiner

WASHER

This application is a 35 USC §371 National Stage entry of International Application No. PCT/KR2012/000365 filed on Jan. 16, 2012, which claims priority to U.S. Provisional Application No. 61/475,653 filed on Apr. 14, 2011, each of which is hereby incorporated by reference in its entirety.

TECHNICAL FIELD

The present invention relates to a washing machine.

BACKGROUND ART

In general, a washing machine is an apparatus for removing a contaminant adhered to clothes, bedding, etc. (hereinafter, referred to as 'the laundry') using a chemical disintegration of water and a detergent and a physical operation such as a friction between water and the laundry. The washing machine has a basic structure in which a drum accommodating the laundry is rotatably installed in a tub. In addition, a washing machine having a nozzle through which water is sprayed into the drum has recently come into the market.

However, in the conventional washing machine having the nozzle, the water sprayed as the form of particles. The particles are not fine enough. Particularly, spray performance is rapidly lowered, and water is not sprayed directly to the laundry in a serious case. That is, the water is not sprayed through nozzles, but gradually filled in a tub from the bottom of a tub to the water level at which the laundry gets wet. Therefore, the water supply in the conventional washing machine is not different from that in a general washing machine.

Since water sprayed through the nozzles is bumped against mechanisms around the nozzles, the water is distributed in an undesired place, which is problematic in terms of sanitation. Further, the laundry again gets wet due to water drops falling from the undesired place.

In the conventional washing machine, water is sprayed in one place or direction, and hence there is a limitation in getting the laundry evenly wet.

DISCLOSURE

Technical Problem

The present invention is conceived to solve the aforementioned problems. Accordingly, an object of the present invention is to provide a washing machine in which water can be more widely sprayed into a drum.

Another object of the present invention is to provide a washing machine in which water in the form of fine particles can be sprayed into a drum.

Still another object of the present invention is to provide a washing machine in which water can be smoothly sprayed into a drum even in an environment in which water pressure is low.

Technical Solution

In accordance with an aspect of the present invention, there is provided a washing machine, comprising: a casing; a tub disposed inside the casing; a drum rotatably provided inside the tub, for accommodating laundry therein; and a spiral nozzle for rotating supplied water in a predetermined direction and then spraying the water into the drum through a discharge hole, wherein the spiral nozzle comprises an impingement surface formed in front of the discharge hole so that the water discharged from the discharge hole is distributed by impinging on the impingement surface.

Advantageous Effects

According to the washing machine of the present invention, water can be more widely sprayed into a drum.

Further, water in the form of fine particles can be sprayed into a drum.

Further, water can be smoothly sprayed into a drum even in an environment in which water pressure is low.

BEST MODE

The present invention now will be described more fully hereinafter with reference to the accompanying drawings, in which embodiments of the invention are shown. This invention should not be construed as limited to the embodiments set forth herein. Rather, these embodiments are provided so that this disclosure will be thorough and complete, and will fully convey the scope of the invention to those skilled in the art. Like numbers refer to like elements throughout.

Figure 1:
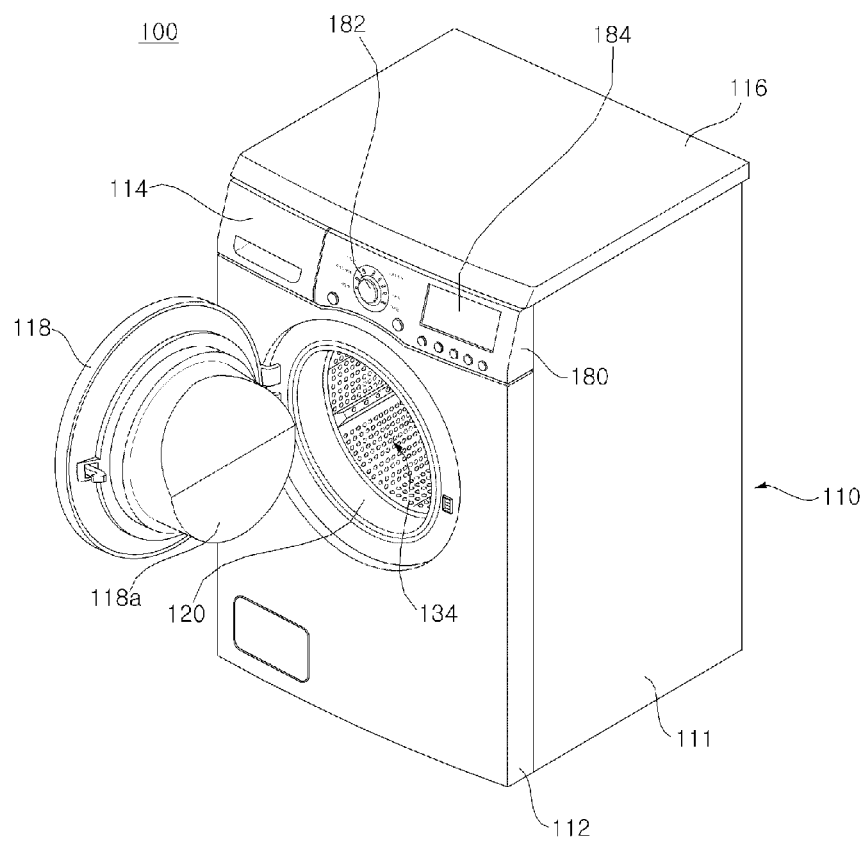
FIG. 1 is a perspective view of a washing machine according to an embodiment of the present invention.
Figure 2:
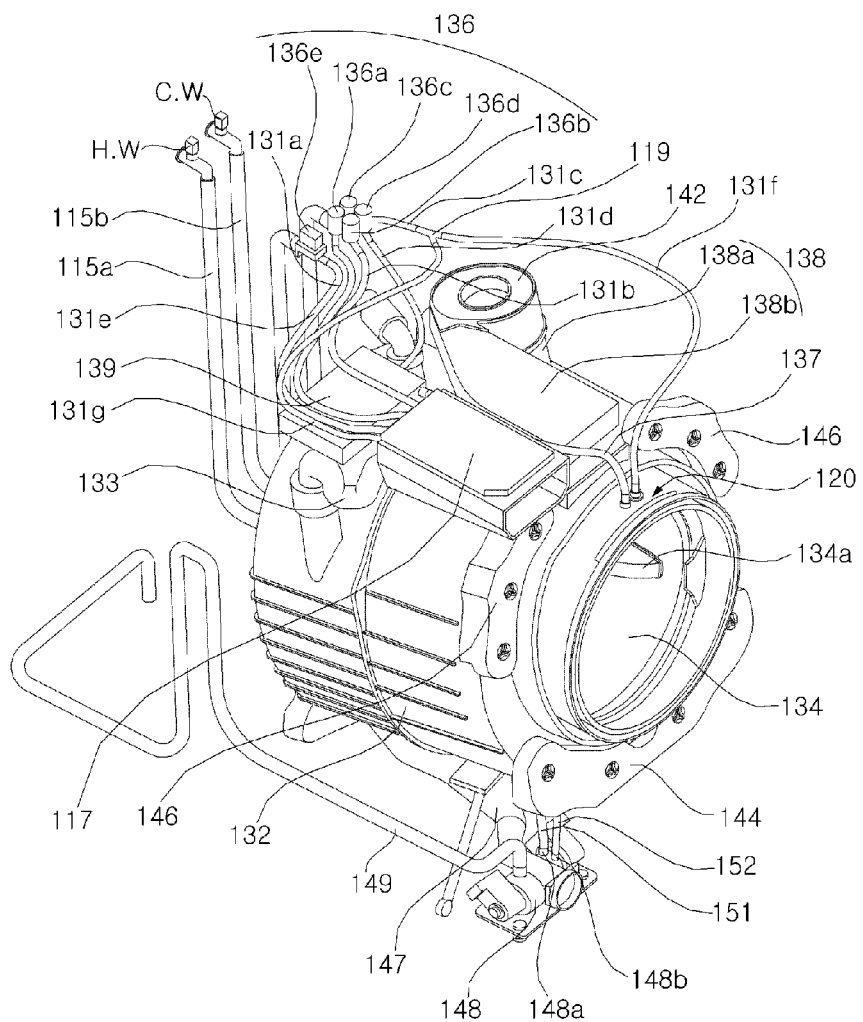
FIG. 2 illustrates a main configuration of the washing machine shown in FIG. 1.
Figure 3:
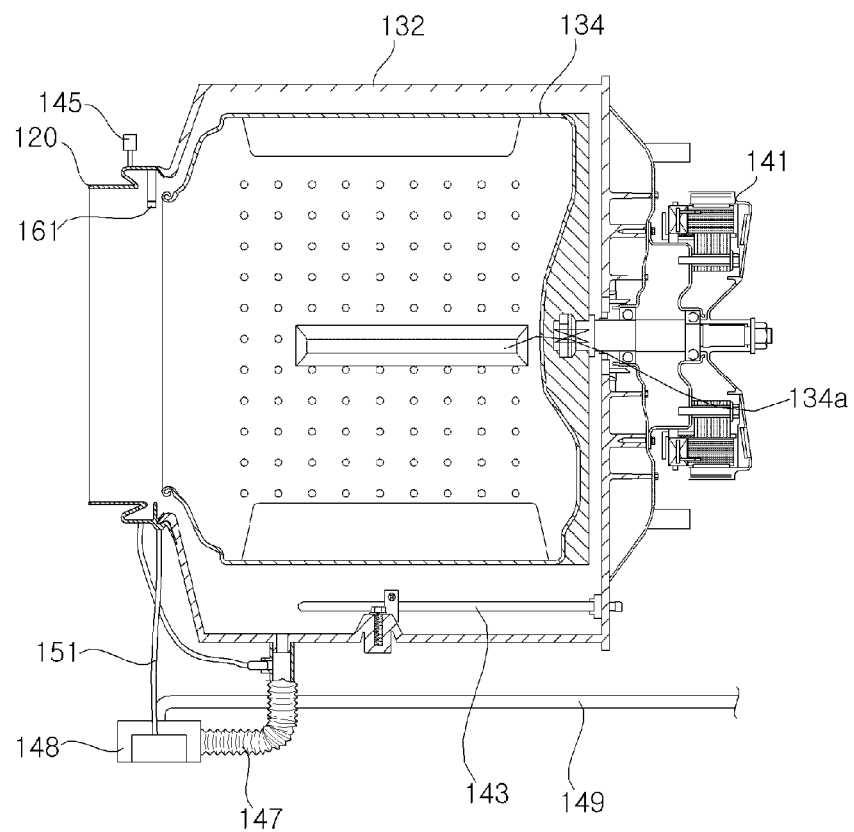
FIG. 3 illustrates a cut-away portion of the washing machine shown in FIG. 1.
Figure 4:
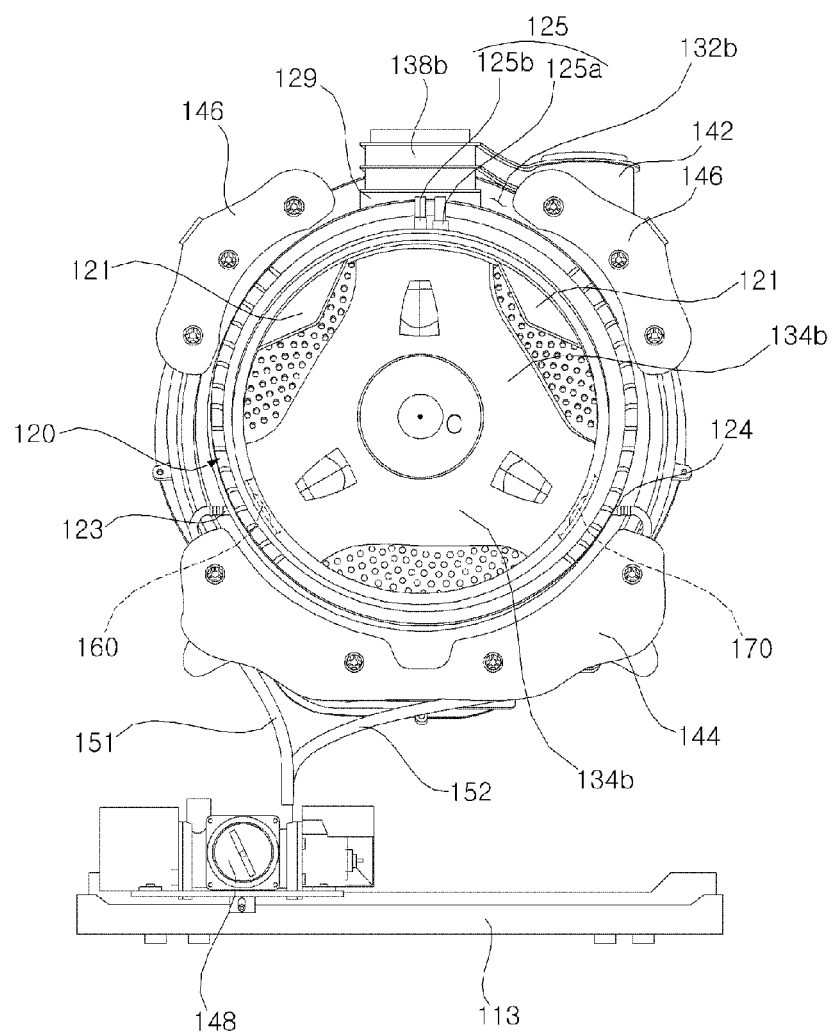
FIG. 4 illustrates the configuration of FIG. 2 viewed from the front.
Figure 5:
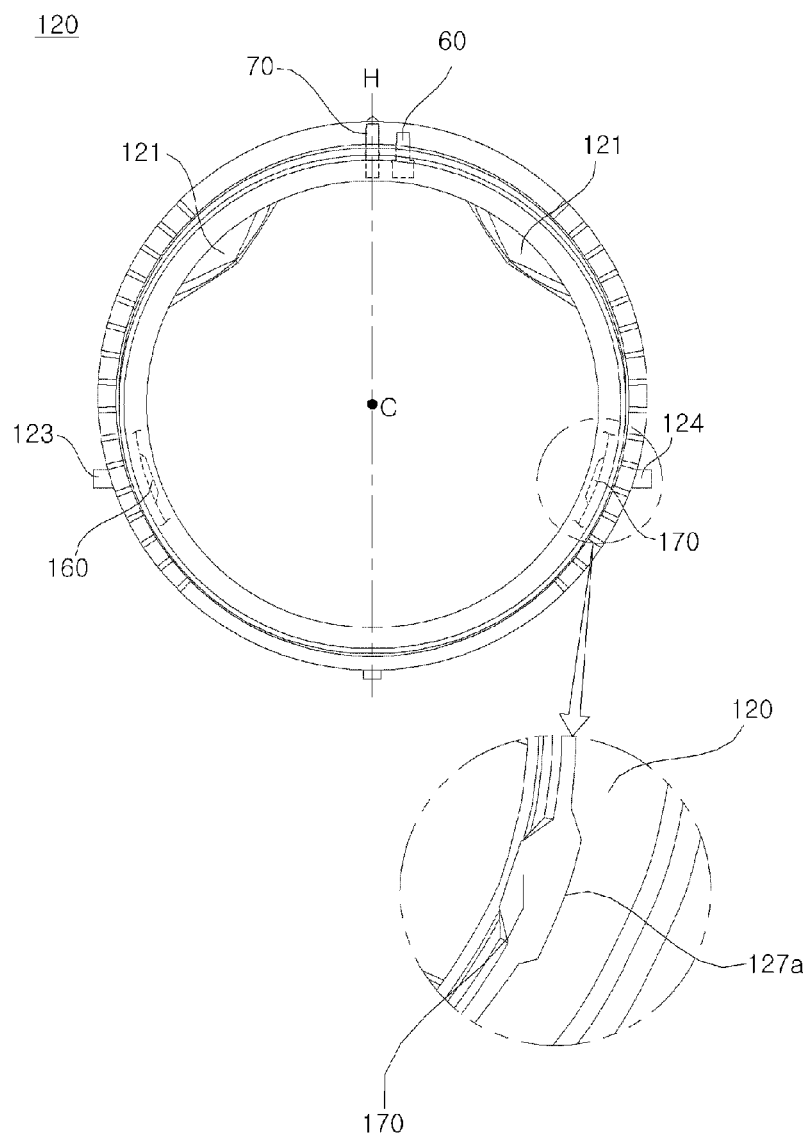
FIG. 5 illustrates a gasket.

FIG. 1 is a perspective view of a washing machine 100 according to an embodiment of the present invention. FIG. 2 illustrates a main configuration of the washing machine 100 shown in FIG. 1. FIG. 3 illustrates a cut-away portion of the washing machine 100 shown in FIG. 1. FIG. 4 illustrates the configuration of FIG. 2 viewed from the front. FIG. 5 illustrates a gasket 120.

Hereinafter, the washing machine 100 according to the embodiment of the present invention will be described with reference to FIGS. 1 to 5.

A casing 110 forms an exterior appearance of the washing machine 100. A tub 132 for containing water is suspended inside the casing 110, and a drum 134 for accommodating laundry is rotatably provided inside the tub 132. The casing 110 may be further provided with a heater 143 for heating the water contained in the tub 132.

The casing 110 may comprise a cabinet 111 which forms the exterior appearance of the washing machine 100 and has opened front and top surfaces, a base 113 (See FIG. 4) supporting the cabinet 111, a front cover 112 which has a laundry input hole through which the laundry can input into the drum 134 and is coupled to the front surface of the cabinet 111, and a top cover 116 provided to the top surface of the cabinet 111. A door 118 opening/closing the laundry input hole may be rotatably provided to the front cover 112.

A glass 118a may be provided to the door 118 so that a user can observe the laundry inside the drum 134 from outside of the washing machine 100. The glass 118a may be formed in a convex shape, and a front end of the glass 118a may be protruded up to inside of the drum 134 in the state in which the door 118 is closed.

A detergent box 114 is used to receive additives such as a detergent for preliminary or main washing, a fabric softener and a bleach. The detergent box 114 is provided to be extractable from the casing 110.

The tub 132 may be suspended by a spring so that vibration generated in rotation of the drum 134 can be absorbed. The drum 134 may be further provided with a damper supporting the tub 132 at the downside of the tub 132.

A plurality of holes are formed in the drum 134 so that water can flow between the tub 132 and the drum 134 therethrough. One or more lifters 134a may be provided along the inner circumferential surface of the drum 134 so that the laundry can be lifted and then drop according to the rotation of the drum 134.

The drum 134 is not disposed completely in horizontal but disposed with a predetermined slope so that a posterior portion of the drum 134 is lower than the horizontal level.

A motor providing a driving force for rotating the drum 134 may be provided to the drum 134. The motor may be classified as a direct driving type or an indirect driving type according to a method for transferring the driving force provided from the motor to the drum 134. In the direct driving type, a rotary shaft of the motor is directly fastened to the drum 134, and the rotary shaft of the motor and a center of the drum 134 are aligned coaxially. The washing machine 100 according to this embodiment is based on the direct driving type. Although the drum 134 is rotated by the motor 141 provided in a space between the rear of the tub 132 and the cabinet 111, the present invention is not necessarily limited thereto, and it is apparent that the indirect driving type described above is possible.washing machine In the indirect driving type, the drum 134 is rotated using a power transfer means such as a belt or pulley for transferring a driving force provided from a motor. In the indirect driving type, a rotary shaft of the motor and the center of the drum 134 are not necessarily aligned coaxially.

The gasket 120 is provided between the casing 110 and the tub 132. The gasket 120 prevents water stored in the tub 132 from leaking between the tub 132 and the casing 110. One side of the gasket 120 is coupled to the casing 110, and the other end of the gasket 120 is coupled to the tub 132 along the circumference of an opened front portion of the tub 132. The gasket 120 is elastically folded/unfolded according to vibration of the tub 132, thereby absorbing the vibration.

The gasket 120 may be made of a deformable or flexible material having a slight elasticity, and may be formed using natural rubber or synthetic resin.

The washing machine 100 is connected to a hot water source H.W for supplying hot water and a cold water source C.W for supply cold water respectively through a hot water hose 115a and a cold water hose 115b, and water flowed in the washing machine 100 through the hot water hose 115a and the cold water hose 115b is supplied to the detergent box 114, a steam generator 139 and/or a spiral nozzle 50 and 60 under a proper control of a water supply unit 136.

Particularly, the water supplied through the cold water hose 115b may be supplied to the detergent box, the steam generator 139 and/or the spiral nozzle 50 and 60 by first to fourth water supply valve 136a to 136d.

The detergent box 114 is received inside of a detergent box housing 117. The detergent box housing 117 is communicated with the tub 132 through a water supply bellows 133. The water supplied by the water supply unit 136 is mixed with additives via the detergent box 114 and then moved into the tub 132 along the water supply bellows 133 connected to the detergent box housing 117.

A washing detergent, a fabric softener, a bleach, etc. may be used as the additives received in the detergent box 114. The detergent box 114 may be provided with a plurality of receiving spaces partitioned so that the additives are not mixed with one another but separately received in the detergent box 114.

First, second and third water supply hoses 131a, 131b and 131c are used to supply water to the detergent box 114, and respectively correspond to the partitioned spaces formed in the detergent box 114 so as to receive the additives. The first, second and third water supply valves 136a, 136b and 136c control the first, second and third water supply hoses 131a, 131b and 131c, respectively.

The steam generator 139 is a device which generates steam by heating water. Water is supplied to the steam generator 139 through the fourth water supply hose 136d. The steam generated in the steam generator 139 is supplied to a steam nozzle 70 and 80 through a steam supply hose 137.

The water supplied through the hot-water hose 115a is flowed into the detergent box 114 through a fifth water supply hose 131e, and a hot water valve 136e for controlling the fifth water supply hose 131e may be provided to the fifth water supply hose 131e.

Meanwhile, a distributor 119 may be connected to the third water supply hose 131c. In this case, water passing through the distributor 119 is distributed to a sixth water supply hose 131f and a seventh water supply hose 131g, and hence water spray through the spiral nozzle 50 and 60 and water supply through the detergent box 114 are simultaneously performed. Thus, the laundry in the drum 134 can be efficiently wet. Particularly, the laundry can be sufficiently wet using only a small amount of water as compared with the conventional method performed only when the water supply is made via the detergent box 114.

A pump 148 is used to drain water discharged from the tub 132 through a drainage bellows 147 to the outside through a drainage hose 149 or to pressure-feed the water to a pair of circulation hoses 151 and 152 respectively connected to first and second gasket nozzles 160 and 170. Therefore, if the pump 148 is operated, the water is sprayed through the gasket nozzles 160 and 170. In this embodiment, the pump 148 has both a function as a drainage pump and a function as a circulation pump. However, it will be apparent that a pump for drainage and a pump for circulation may be separately provided.

The water pressure-fed by the pump 148 is simultaneously supplied to the first and second circulation hoses 151 and 152. Thus, the water is simultaneously sprayed toward the laundry from the first and second gasket nozzles 160 and 170.

The pump 148 may comprise an impeller rotated by the motor 141, and a pump housing in which the impeller is accommodated. The pump housing may be provided with first and second discharge ports 148a and 148b through which the water pressure-fed by the rotation of the impeller is discharged. The first circulation hose 151 may be connected to the first discharge port 148a, and the second circulation hose 152 may be connected to the second discharge port 148b. Since water is discharged from the pump 148 through the two discharge ports 148a and 148b independent to each other, the water can be supplied at the same water pressure to the circulation hoses 151 and 152.

Figure 11:
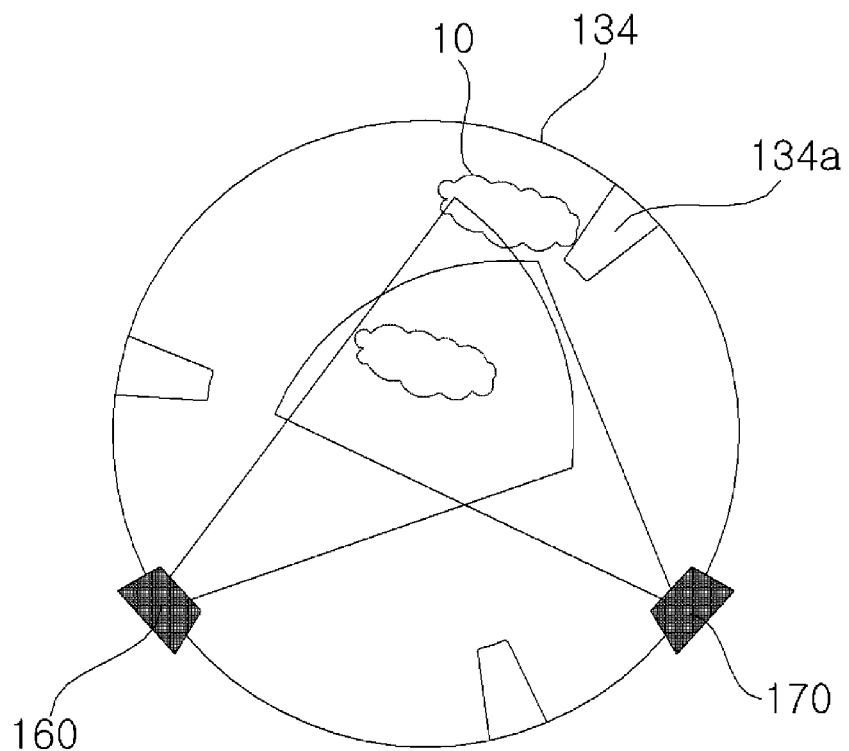
FIG. 11 schematically illustrates a pattern in which washing water is sprayed through gasket nozzles.

FIG. 11 schematically illustrates a pattern in which washing water is sprayed through the gasket nozzles. Referring to FIG. 11, laundry 10 is repetitively lifted by the lifter 134a and then drop while the drum 134 is rotating. In this case, the first and second gasket nozzles 160 and 170 simultaneously spray water toward the dropping laundry 10. Such a manner has an advantage in that the water can be evenly sprayed toward the laundry 10 regardless of the rotation direction of the drum 134.

However, a distributor may be provided between the pump 148 and the circulation hoses 151 and 152 so that the water is alternately sprayed through the pair of gasket nozzles 160 and 170. In this case, the water may be selectively sprayed through the first or second gasket nozzle 160 or 170 according to the rotation direction of the drum 134, under a proper control of the distributor.

A drying duct 138 is used to guide the movement of air so that air in the tub 132 is exhausted to the outside of the tub 132 and then again guided to the inside of the tub 132. The drying duct 138 may comprise a first drying duct 138a and a second drying duct 138b.

The first drying duct 138a guides air from the tub 132 to an air blower 142. The side of the first drying duct 138a, at which the air is flowed in the first drying duct 138a, is connected to the tub 132, and the side of the first drying duct 138a, at which the air is exhausted from the first drying duct 138a, is connected to the air blower 142.

The second drying duct 138b guides the air blown by the air blower 142 into the tub 132. The side of the second drying duct 138b, at which the air flowed in the second drying duct 138b, is connected to the air blower 142, and the side of the second drying duct 138b, at which the air is exhausted from the second drying duct 138b, is connected to the tub 132. In this embodiment, the gasket 120 is provided with a duct connecting portion 129 to which the second drying duct 138b is connected. The duct connecting portion 129 allows the inside of the drum 134 and the second drying duct 138b to communicate with each other.

A nozzle unit coupling portion 125 having a nozzle unit 161 coupled thereto may be formed at an upper portion of the gasket 120. The nozzle unit coupling portion 125 may comprise a first insertion hole 125a through which a spiral flow generating pipe 60 is inserted and coupled to the nozzle unit coupling portion 125, and a second insertion hole 125b through which a steam inlet pipe 70 is inserted and coupled to the nozzle unit coupling portion 125.

The air blower 142 blows air to be circulated along the drying duct 138. The air blower 142 may include an appropriate type of fan according to the arrangement relationship between the first and second drying ducts 138a and 138b. The air blower according to this embodiment includes a centrifugal fan. The centrifugal fan is suitable to exhaust air sucked from the downside of the centrifugal fan through the first drying duct 138a to the second drying duct 138b connected to the centrifugal fan in the side direction.

Meanwhile, a drying heater (not shown) may be provided to remove moisture from the air flowing along the drying duct 138. The drying heater may be disposed inside the drying duct 138, particularly inside the second drying duct 138b along which the air pressure-fed by the air blower 142 is guided.

A control panel 180 may comprise a course selection unit 182 receive a course selection input from a user, an input/output unit 184 which receives various kinds of control commands and displays an operating state of the washing machine 100. The control panel 180 will be described in detail later with reference to FIG. 12.

Separation preventing protrusions 121 may be formed at the gasket 120. Here, the separation preventing protrusions 121 prevents the laundry from being separated from the drum 134 by the rotation of the drum 134 and then inserted between the gasket 120 and the casing 110, particularly the front cover 112, or prevents the laundry from being poured to the outside of the washing machine 100 when the door 118 is opened after washing is finished. The separation preventing protrusions 121 are formed to protrude toward the laundry input hole from the inner circumferential surface of the gasket 120.

The separation preventing protrusions 121 may be formed at a plurality of positions. Particularly, the separation preventing protrusions 121 may be respectively formed at positions symmetrical to one another with respect to the vertical center line H of the gasket 120.

The gasket 120 may comprise a plurality of gasket nozzles 160 and 170 spraying water into the drum 134, and a plurality of connectors 123 and 124 supplying water to the respective gasket nozzles.

Although it has been described in this embodiment that water is sprayed by the two gasket nozzles 160 and 170, the present invention is not limited thereto. That is, two or more gasket nozzles may be provided to spray water into the drum 134 in a plurality of directions.

The gasket nozzles 160 and 170 may be integrally formed with the gasket 120. For example, the gasket nozzles 160 and 170 and the gasket 120 may be integrally formed through injection molding using synthetic resin.

The gasket nozzles 160 and 170 may be formed to protrude from an inner circumferential surface of the gasket 120, and the connectors 123 and 124 respectively connected to the circulation hoses 151 and 152 may be formed on an outer circumferential surface of the gasket 120. The connectors 123 and 124 may comprise a first connector 123 for connecting the first gasket nozzle 160 and the first circulation hose 151, and a second connector 124 for connecting the second gasket nozzle 170 and the second circulation hose 152.

More specifically, the first or second gasket nozzle 160 and 170 sprays water into the drum 134. Preferably, the water sprayed through the gasket nozzles 160 and 170 reaches not only the inner circumferential surface of the drum 134 but also a posterior wall 134b of the drum 134. Particularly, in a case where a small quantity of laundry is input into the drum 134, the laundry is gathered near the posterior wall 134b of the drum 134 due to the rotation or slope of the drum 134. In this case, the laundry can be wet by the water sprayed from the gasket nozzles 160 and 170.

The water sprayed from the first gasket nozzle 160 and the water sprayed from the second gasket nozzle 170 preferably intersect with each other at least one time before reaching the posterior wall 134b of the drum 134. The first and second gasket nozzles 160 and 170. This is for the purpose that the water sprayed from the first gasket nozzle 160 and the water sprayed from the second gasket nozzle 170 intersect with each other, and thus the sprayed water can reach a wider region even though interference is made to a degree, rather than that the water sprayed from the first gasket nozzle 160 and the water sprayed from the second gasket nozzle 170 never intersect with each other, and therefore, a region that the water does not reach in the drum is formed to a degree or more.

Meanwhile, a waiter may be provided to the tub 132. The waiter is a weight body having a considerable degree of weight, and the stability of the tub 132 can be maintained by inertia imposed by the waiter even in the rotation of the drum 132. The waiter may be provided with a plurality of waiters at a front portion 132b of the tub 132. In the washing machine 100 according to this embodiment, two upper waiters 146 horizontally symmetrical to each other with respect to the vertical center line H are provided higher than the horizontal center line C of the tub 132, and a lower waiter 144 is provided centrally lowered than the horizontal center line C of the tub 132. In order to avoid interference with the lower waiter 144, the first and second connectors 123 and 124 are preferably disposed at both sides of the lower waiter 144, respectively.

The first and second nozzles 160 and 170 may be disposed symmetrically to each other with respect to the vertical center line H passing through the center of the gasket 120 so that washing water is evenly sprayed into the drum 134.

Particularly, the first and second gasket nozzles 160 and 170 may be provided at both sides of the lower portion of the gasket 120 in a range that does not exceed a half of the height of the gasket 120. In this case, the first gasket nozzle 160 upwardly sprays water toward the inside of the drum 134 from the left lower portion of the gasket, and the second gasket nozzle 170 upwardly sprays water toward the inside of the drum 134 from the left lower portion of the gasket 120 (See FIG. 11). The laundry, which is lifted by the lifter 134a and then drops, passes through a spray region formed by the first and second gasket nozzles 160 and 170. The gasket nozzles 160 and 170 upwardly spray water toward the dropping laundry, so that the sprayed water applies a strong impact to the laundry. Thus, the laundry is bent and stretched, thereby improving the washing performance of the laundry.

Figure 6:
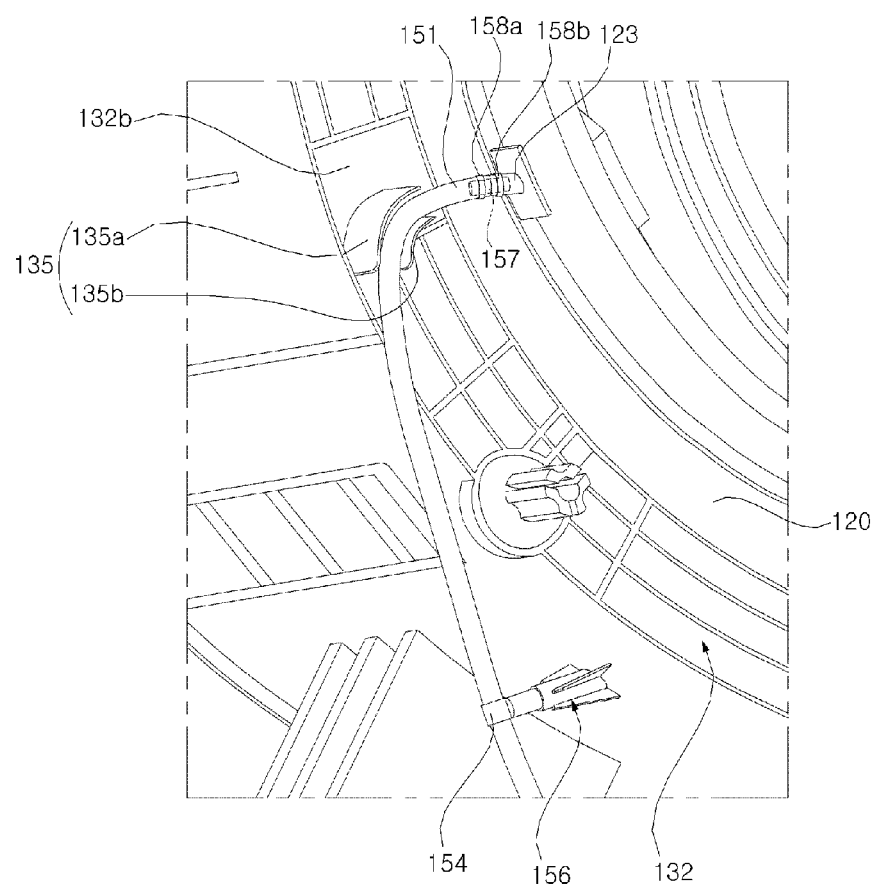
FIG. 6 illustrates a structure in which circulation hoses are fixed.

FIG. 6 illustrates a structure in which the circulation hoses 151 and 152 are fixed. Referring to FIG. 6, a holder 135 for fixing the circulation hose 151 or 152 may be formed at the tub 132. The holder 135 may include a pair of fixing ribs 135a and 135b protruded from the front portion 132b of the tub 132, and the circulation hoses 151 or 152 is inserted and fixed between the pair of fixing ribs 135a and 135b.

When considering the structure in which the pump 148 is positioned below the tub 132, and the connectors 123 and 124 are protruded from the gasket 120 in an approximately horizontal direction, the fixing ribs 135a and 135b are preferably formed in a bent shape.

A clamp 154 is used to fix the circulation hose 151 or 152 to the tub 132, and clamps the circulation hose 151 or 152. A boss 156 having the clamp 154 fixed and coupled thereto may be formed at a lower outside of the tub 132.

As such, in the structure in which the circulation hose 151 or 152 is fixed to the tub 132 by the fixing ribs 135a and 135b and the clamp 154, the circulation hose 151 or 152 integrally moves with the tub 132. Thus, although vibration is generated during the operation of the washing machine 100, it is possible to reduce tension applied to the circulation hose 151 or 152, thereby reducing the disconnection of the circulation hose 151 or 152.

Through a simple process of preliminarily inserting the circulation hose 151 or 152 into the holder 135 and then fastening the clamp 154 to the circulation hose 151 or 152, the circulation hose 151 or 152 can be fixed to the tub 132, thereby simplifying an assembling process.

Meanwhile, the circulation hose 151 or 152 may be connected to the connector 123 or 124 by a connection tube 157. The circulation hoses 151 and 152 may be made of a flexible material, and the connector 123 may be integrally formed with the flexible gasket 120. The connection tube 157 is formed of a material relatively harder than that of the connector 123, and both ends of the connection tube 157 are respectively inserted into the circulation hose 151 or 152 and the connector 123 or 124, so that it is possible to further facilitate the coupling between the circulation hose 151 or 152 and the connector 123 or 124.

In order to further ensure the connection between the circulation hose 151 or 152 and the connector 123 or 124 through the connection tube 157, there are further provided a clamp 158a for clamping one end of the circulation hose 151 or 152 into which the connection tube 157 is inserted, and a clamp 158b for clamping one end of the connector 123 or 124 into which the connection tube 157 is inserted.

Figure 7:
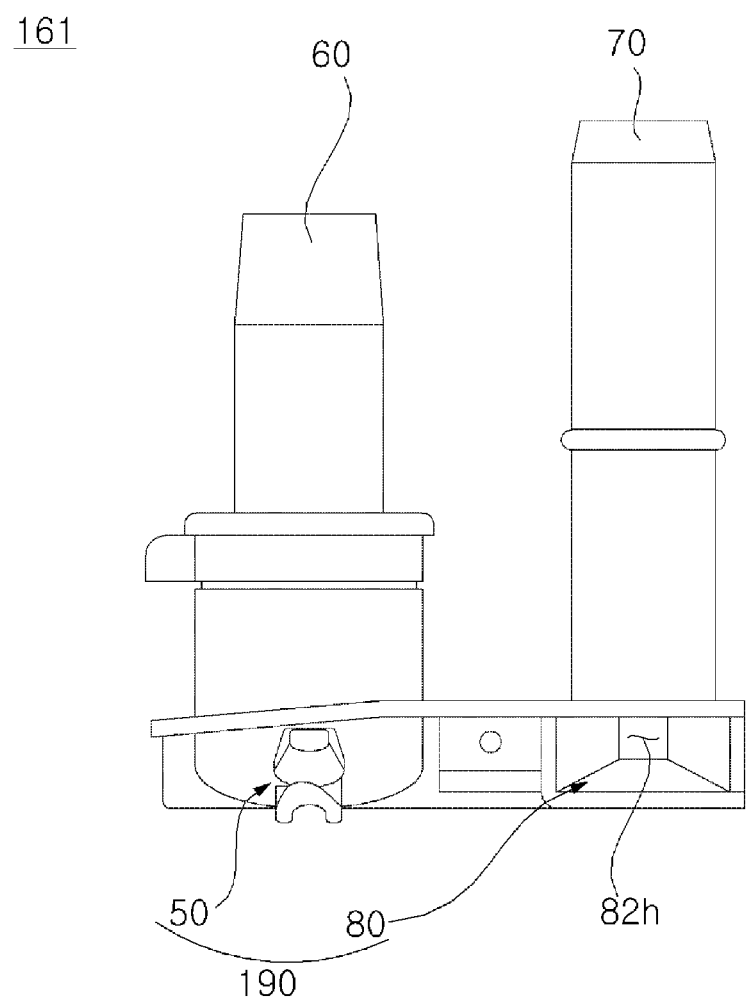
FIG. 7 illustrates a nozzle unit.
Figure 8A:
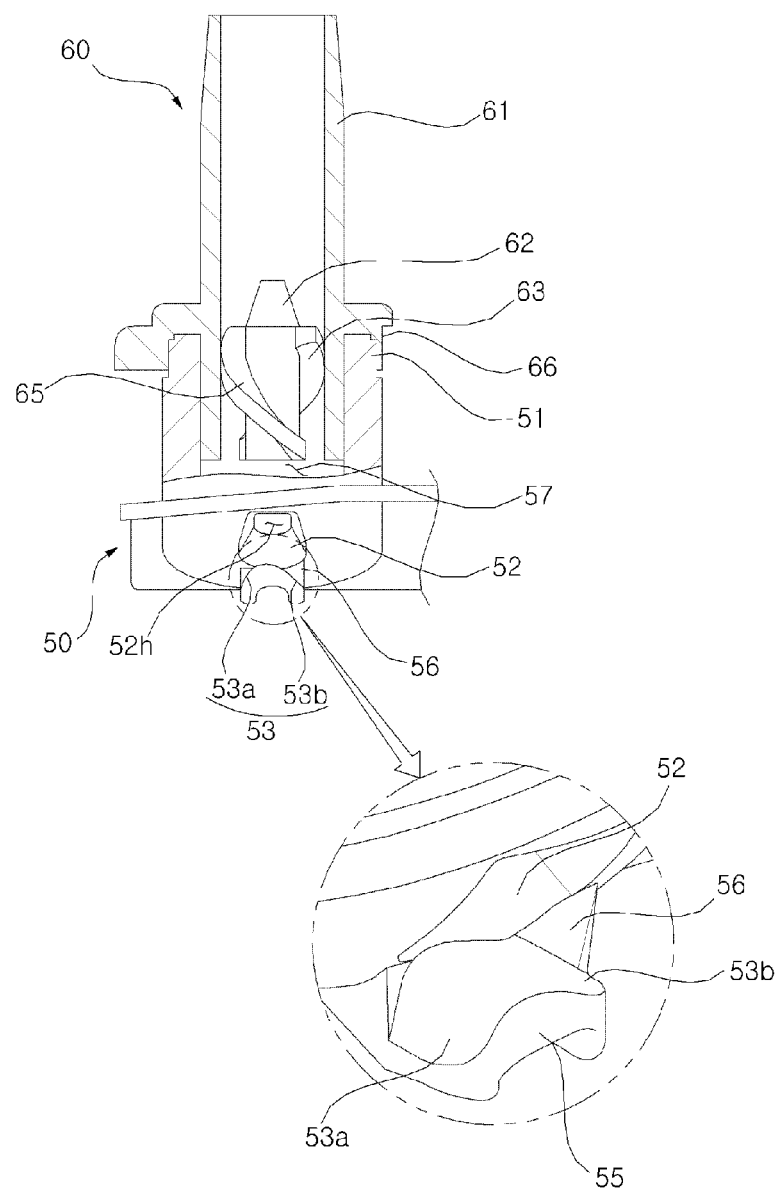
FIG. 8A is a partial cut-away view of a spiral nozzle shown in FIG. 7.
Figure 8B:
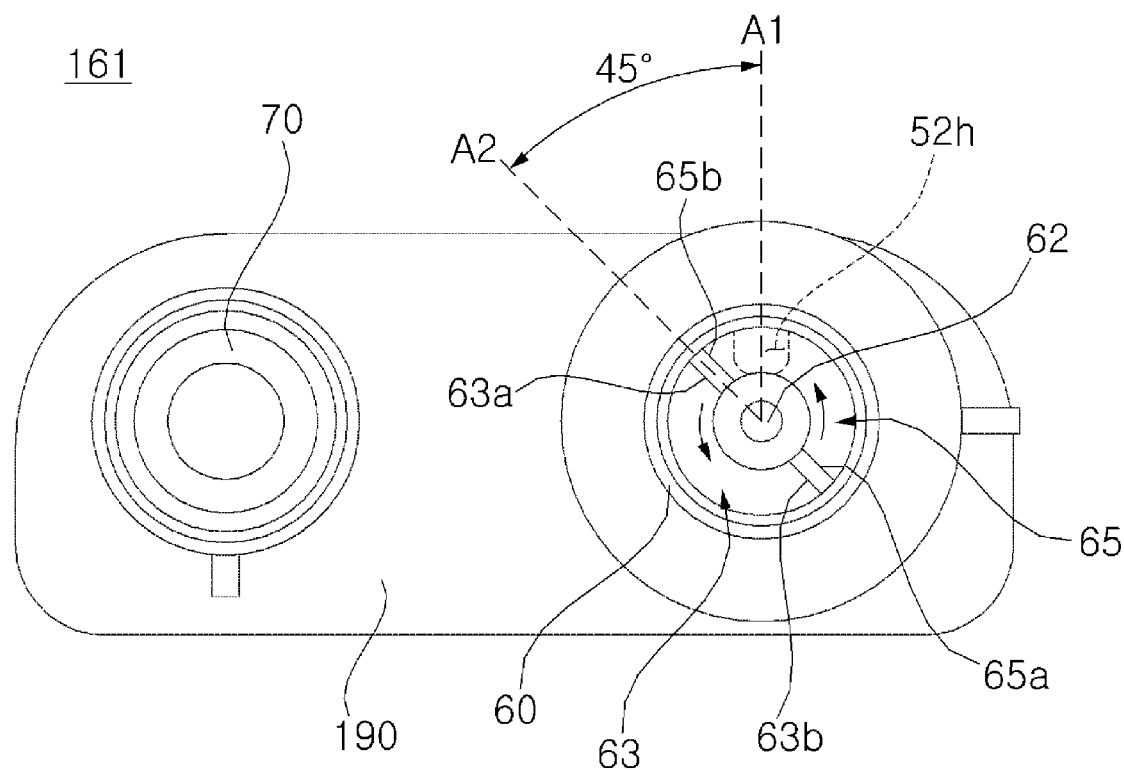
FIG. 8B is plan view of the nozzle unit of FIG. 7 viewed from the top to the bottom.

FIG. 7 illustrates the nozzle unit 161. FIG. 8A is a partial cut-away view of the spiral nozzle 50 and 60 shown in FIG. 7. FIG. 8B is plan view of the nozzle unit 161 of FIG. 7 viewed from the top to the bottom.

Referring to FIGS. 7, 8A and 8B, the nozzle unit 161 may be provided at the upper portion of the gasket 120. The nozzle unit 161 comprises a spiral nozzle through which water is sprayed into the drum 134, and a steam nozzle through which steam is sprayed into the drum 134. It will be apparent that the spiral and steam nozzles may be formed as separate components independent to each other. The nozzle unit 161 may be formed as an assembly of a spiral flow generating pipe 60, a nozzle cap 190 and a steam inlet pipe 70. Hereinafter, a component 50 and 60 that generates a spiral flow and sprays into the drum 134 is referred to as a spiral nozzle, and the component 70 and 80 that sprays steam into the drum 134 is referred to as a steam nozzle.

The spiral nozzle 50 and 60 transforms the water supplied through the water supply hoses 131c and 131f into a spiral flow and sprays into the drum 134. The spiral nozzle 50 and 60 comprises a spiral flow generating pipe 60 connected to the sixth water supply hose 131f, and a spiral nozzle cap 50 spraying water flowed through the spiral flow generating pipe 60 into the drum 134.

The spiral nozzle cap 50 comprises a discharge hole 52h discharging the water supplied through the spiral flow generating pipe 60, and an impingement surface 55 formed on a path along which the water discharged through the discharge hole 52h moves so that the flow of the water can be distributed by causing impingement in the advancing direction of the water.

Since the water sprayed through the discharge hole 52h is distributed while being again bumped against the impingement surface 55, the water can be evenly sprayed into the drum 134 even when the water pressure is low.

More specifically, the spiral nozzle cap 50 provides a predetermined space in which water is contained in the inside thereof, and the predetermined space communicates with the outside through the discharge hole 52*h*. The water discharged through the discharge hole 52*h* moves along a discharge channel 52 extended while downwardly forming a slope, and then distributed while being bumped against the impingement surface 55 formed at the finish end of the discharge channel 52. Therefore, the impingement surface 55 is not extended in parallel with the advancing direction of the water along the discharge channel 52, but preferably formed at a predetermined angle with the discharge channel 52 so that the water moving along the discharge channel 52 can be distributed by the impingement surface 55.

The spiral flow generating pipe 60 comprises a flow channel forming pipe 61 connected to the sixth water supply hose 131 for forming a flow channel of water in the inside thereof, and at least one vane for guiding water to advance while rotating in a certain direction in the flow channel forming pipe 61. In a case where the vane is provided with a plurality of vanes, the space in the flow channel forming pipe 61 is partitioned into spaces by the respective vanes, and the vanes form flow channels for independently guiding water. Hereinafter, a case where first and second vanes 63 and 65 rotating in the same direction are formed will be described as an example.

A vane shaft 62 is formed at the center of the flow channel forming pipe 61, and the vanes 63 and 65 are formed while connecting the inner circumferential surface of the flow channel forming pipe 61 and the vane shaft 62. The vanes 63 and 65 advance in the length direction of the vane shaft while being rotated along the circumference of the vane shaft 62. The boundary between the inner side of the vane 63 or 65 and the vane shaft 62 and the boundary between the outer side of the vane 63 or 65 and the flow channel forming pipe 61 form a pair of spiral curves parallel with each other.

Water is transformed into a spiral flow while being guided along the vanes 63 and 65 in the flow channel forming pipe 61. The water transformed into the spiral flow is evenly sprayed into the drum 134 by the rotation force thereof.

The vane shaft 62 is not necessarily extended, corresponding to the entire length of the flow channel forming pipe 61, but extended shorter along the vane shaft 62 than the entire length of the flow channel forming pipe 61. In this case, the finish end 63*b* or 65*b* of the vanes 63 or 65, at which the rotation of the water is finished in the flow channel forming pipe 61, are preferably extended up to the end portion of the flow channel forming pipe 61.

The first and second vanes 63 and 65 are preferably formed to have no portion at which the first and second vanes 63 and 65 overlap with each other. Therefore, the position relationship between the start end 63*a* of the first vane 63 and the finish end 65*b* of the second vane 65 is relative to that between the finish end 63*b* of the first vane 63 and the start end 65*a* of the second vane 65. The rotation angle from the start end 63*a* to the finish end 63*b* of the first vane 63 is also relative to that from the start end 65*a* to the finish end 65*b* of the second vane 65.

For example, if the first vane 63 is rotated by an angle x while being extended from the start end 63*a* to the finish end 63*b*, the start and finish ends 65*a* and 65*b* of the second vane 65 are necessarily formed in a region except the region in which the first vane 63 is formed on the plane viewed along the vane shaft 62. The second vane 65 is rotated in the range where an angle except the rotation angle of the first vane 63, i.e., an angle of (360-x) degrees is set to the maximum value while being extended from the start end 65*a* to the finish end 65*b*.

That is, if the structure of any one of the first and second vanes 63 and 65 is determined within the range where the first and second vanes 63 and 65 do not overlap with each other, variables such as the start end, finish end, extension length and maximum rotation angle of the other are limited to a predetermined range.

The spiral flow generating pipe 60 may be formed through injection molding. In this case, it is required a careful design for easy extraction from a mold is required, in consideration of the structures of the vanes 63 and 65 formed in the spiral flow generating pipe 60. The first and second vanes 63 and 65 do not necessarily overlap with each other as described above. In addition, when viewing the first and second vanes 63 and 65 along the length direction of the vane shaft 62, a predetermined interval is preferably formed between the start end 63*a* of the first vane 63 and the finish end 65*b* of the second vane 65. Similarly, a predetermined interval is preferably formed between the finish end 63*b* of the first vane 63 and the start end 65*a* of the second vane 65.

Meanwhile, since it is sufficient that the movement of a core is possible in the injection molding, the interval between the start end 63*a* of the first vane 63 and the finish end 65*b* of the second vane 65 or the interval between the finish end 63*b* of the first vane 63 and the start end 65*a* of the second vane 65 may have a small value. The extension length or rotation angle of the first or second vane 63 or 65, which is lost by the interval, is very small, which can be neglected.

In the range where the first and second vanes 63 and 65 do not overlap with each other, the first vane 63 may be substantially rotated by 180 degrees while advancing from the start end 63*a* to the finish end 63*b* so as to have the maximum extension length of the first vane 63, and the second vane 65 may be substantially rotated by 180 degrees while advancing from the start end 65*a* to the finish end 65*b* so as to have the maximum extension length of the second vane 65 (Strictly speaking, there exists a loss angle caused by the interval between the start end 63*a* of the first vane 63 and the finish end 65*b* of the second vane 65 or the interval between the finish end 63*b* of the first vane 63 and the start end 65*a* of the second vane 65, and hence the rotation angle of each vane is less than 180 degrees). In this case, the start end 63*a* of the first vane 63 and the start end 65*a* of the second vane 65 are positioned symmetrical to each other about the vane shaft 62, and the finish end 63*b* of the first vane 63 and the finish end 65*b* of the second vane 65 are also positioned symmetrical to each other about the vane shaft 62.

The finish end 63*b* or 65*b* of each vane forms a predetermined angle with a discharge port 62*h* about the vane shaft 62. For example, in FIG. 8B, the angle made by the discharge hole 52*h* of the spiral nozzle cap 50 and the start end 63*a* of the first vane 63 about the vane shaft 62 is represented as an angle (45 degrees) between A1 and A2. This indicates that the angle made by the discharge hole 52*h* and the finish end 63*b* of the first vane 63 is 135 degrees.

The impingement surface 55 may comprise a curved surface portion 53 for guiding the water bumped against the impingement surface 55 to be sprayed downward, and first and second descent guidance surfaces 53*a* and 53*b* extended to have a gradient at both sides thereof. Here, the first and second descent guidance surfaces 53*a* and 53*b* may be extended to have different gradients.

Particularly, the gradients of the first and second descent guidance surfaces 53*a* and 53*b* may be determined in consideration of the position of the spiral nozzle 50 and 60 on the gasket 120. That is, in a case where the spiral nozzle 50 and 60 is not positioned on the vertical center line H of the gasket 120 but positioned biased to one side, the gradients of the first and second descent guidance surfaces 53a and 53b may be set different from each other so that water can be evenly sprayed into the drum 134. Preferably, the descent guidance surface 53a guiding the water sprayed into a region belonging to the spiral nozzle 50 and 60 about the vertical center line H has a greater gradient than the other descent guidance surface 53b. In this embodiment described with reference to FIGS. 4 and 5, the steam nozzle 70 and 80 is aligned on the vertical center line H of the gasket 120. Therefore, the spiral nozzle 50 and 60 is disposed in a right region about the vertical center line H. In this case, the gradient of the first descent guidance surface 53a guiding most of the water sprayed into the right region is formed greater than that of the second descent guidance surface 53b.

Meanwhile, the reason why the first and second descent guidance surfaces 53a and 53b are formed to have different gradients is that although the spiral nozzle 50 and 60 is disposed at the position biased to one side from the vertical center line H, the water can be sprayed while avoiding the separation preventing protrusion 121 respectively formed at the positions symmetrical to each other about the vertical center line H. Since the spiral nozzle 50 and 60 is not positioned on the vertical center line H, the position relationship between the spiral nozzle 50 and 60 and any one separation preventing protrusion 121 is different from that between the spiral nozzle 50 and 60 and the other separation preventing protrusion 121. Therefore, spray patterns of water through the first and second descent guidance surfaces 53a and 53b are necessarily guided different from each other so that the water is sprayed while avoiding both the separation preventing protrusions 121. To this end, the plan for differentiating the gradient of the first descent guidance surface 53a from that of the second descent guidance surface 53b can be considered.

Meanwhile, a barrier 56 for limiting the lateral movement of the water flowing along each guidance surface may be formed on at least one of the first and second descent guidance surfaces 53a and 53b. Particularly, the barrier 56 may be formed on any one of the first and second descent guidance surfaces 53a and 53b, in consideration of the rotation direction of the water in the spiral flow generating pipe 60. That is, since the water in the spiral flow generating pipe 60 is rotated by the vanes 63 and 65, the flow rate of the water guided along the first descent guidance surface 53a and the flow rate of the water guided along the second descent guidance surface 53b have different values from each other, and there may occur a problem in that the water is distributed to the gasket 120 at the side where the water is guided at a relatively strong flow rate of the first and second descent guidance surfaces 53a and 53b. Therefore, the barrier 56 may be formed on at least one of the first and second descent guidance surfaces 53a and 53b. Preferably, the barrier 56 is formed at the side where the water with a greater flow rate is guided among the first and second descent guidance surfaces 53a and 53b, in consideration of the rotation directions of the vanes 63 and 65.

Referring to FIG. 8A, in this embodiment, the rotation direction of the water in the spiral flow generating pipe 60 is clockwise (viewed from the top to the bottom in FIG. 7), and accordingly, the water with a great flow rate is guided along the second descent guidance surface 53b, rather than the first descent guidance surface 53a. Thus, the barrier 56 is formed on the second descent guidance surface 53b.

As described above, the first descent guidance surface 53a is formed to have a greater gradient than the second descent guidance surface 53b, and the barrier 56 is formed on the second descent guidance surface 53b. However, which gradient of the first and second descent guidance surfaces 53a and 53b is to be formed greater than the other and which one of the first and second descent guidance surfaces 53a and 53b the barrier 56 is to be formed on are preferably determined by comprehensively considering various variables. The variables may be a position of the spiral nozzle 50 and 60 on the gasket, a position of the separation preventing protrusion 121, a spray angle of water, at which the water can be sprayed while avoiding the door glass 118a protruded inside the drum 134, etc.

The steam nozzle 70 and 80 is used to spray the steam supplied through the steam supply hose 137 into the drum 134. The steam nozzle 70 and 80 may comprise a steam inlet pipe 70 fixed to the gasket 120 and connected to the steam supply hose 137, and a steam nozzle cap 80 having a steam spray hole 82h through which the steam flowed in through the steam inlet pipe 70 is sprayed into the drum 134. The steam nozzle cap 80 and spiral nozzle cap 50 are formed as a one body and make up nozzle cap 190. In this case, the nozzle unit 161 may be configured as an assembly obtained by integrally coupling the spiral flow generating pipe 60, the steam inlet pipe 70 and the nozzle cap 190, which are respectively injection-molded using separate members.

Figure 9:
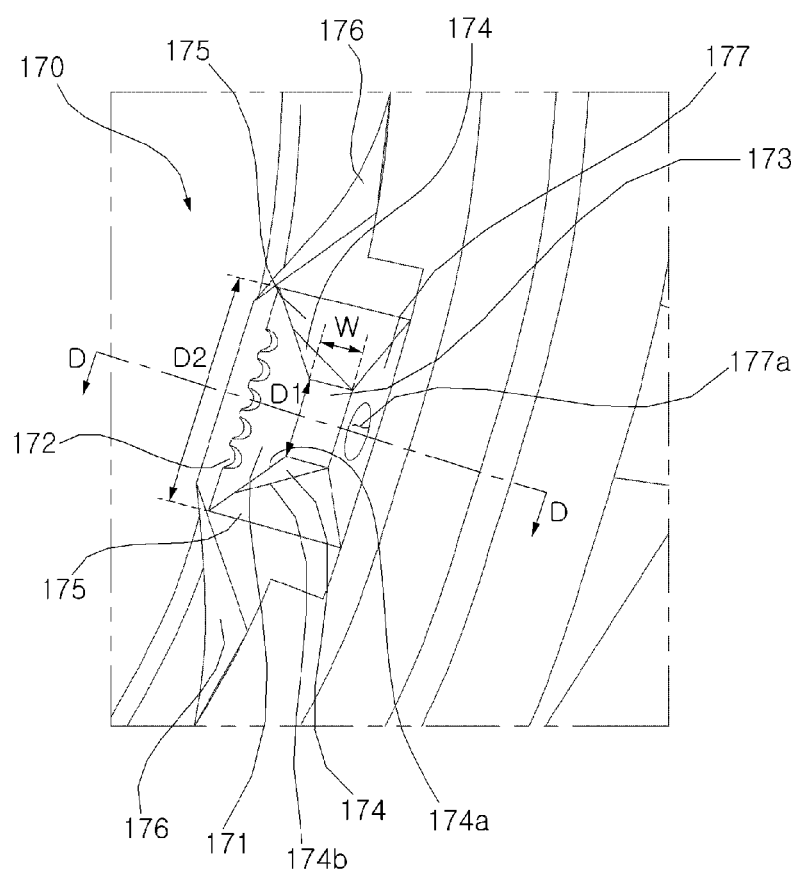
FIG. 9 illustrates a gasket nozzle.
Figure 10:
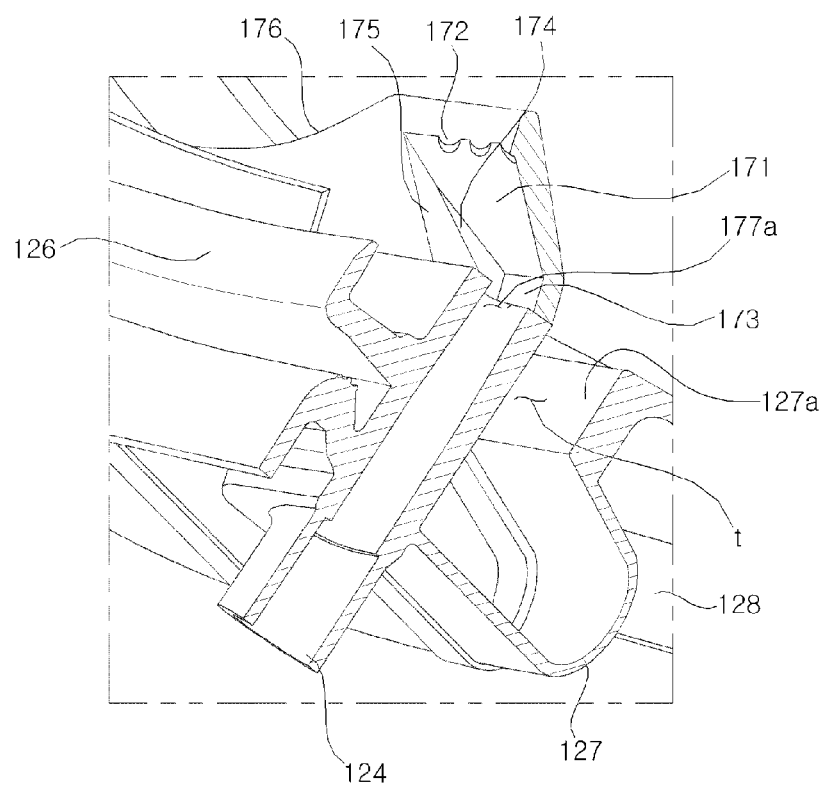
FIG. 10 is a perspective view taken along line D-D of FIG. 9.

FIG. 9 illustrates a gasket nozzle. FIG. 10 is a perspective view taken along line D-D of FIG. 9. FIG. 11 schematically illustrates a pattern in which washing water is sprayed through gasket nozzles.

Referring to FIGS. 9 to 11, the gasket 120 may comprise a casing connecting portion 128 connected to the casing 110, particularly the front cover 112, a tub connecting portion 126 connected to the tub 132, and a folding portion 127 folded/unfolded by vibration of the tub 132.

The first and second gasket nozzles 160 and 170 are disposed symmetrical to each other about the vertical center line H on the gasket 120, but the structures of the first and second gasket nozzles 160 and 170 are substantially identical to each other. Hereinafter, the second gasket nozzle 170 will be mainly described.

The gasket nozzle 170 comprises a spray guidance surface 171 guiding water to be upwardly sprayed toward the inside of the drum 134 by refracting the advancing direction of water flowed in through an inlet 177a communicating with the connector 124, and a plurality of protrusions 172 arranged along the width direction of the spray guidance surface 171 on the spray guidance surface 171.

The width of the spray guidance surface 171 is gradually widened along the advancing direction of the water. In FIG. 9, the spray guidance surface 171 at the start end where the guidance of the water flowed in from the inlet 177a is started has a width D1, and the spray guidance surface 171 at the finish end where the water guided along the spray guidance surface 171 is sprayed while being separated has a width D2 (D1<D2).

The protrusions 172 are preferably formed adjacent to the finish end of the spray guidance surface 171. The width of the spray guidance surface 171 at the finish end of the spray guidance surface 171 may be maximized.

The gasket nozzle 170 may comprise an inlet forming surface 177 having the inlet 177a through which the inflow of water is made while communicating with the connector 124, and a pair of flow channel narrowing surfaces 174 for reinforcing the flow rate of water advancing toward the finish end of the spray guidance surface 171 by limiting the lateral flow of water discharged from the inlet 177a to the spray guidance surface 171. The water passing through the inlet 177a is guided along a flow channel surrounded by the spray guidance surface 171 and the pair of flow channel narrowing surfaces 174 respectively formed at both sides of the spray guidance surface 171.

An interval forming surface 173 is used to allow the spray guidance surface 171 to be spaced apart from the inlet forming surface 177 in which the inlet 177a is formed. In FIG. 9, the start end of the spray guidance surface 171 is spaced apart by an interval corresponding to the height W of the inlet forming surface 177 from the inlet forming surface 177. Since the spray guidance surface 171 is spaced apart from the inlet forming surface 177, it is possible to facilitate inserting and removing a mold for forming the inlet 177a in the injection molding.

The lateral flow of water flowed in through the connector 124 is limited by the flow channel narrowing surface 174 from when the water is discharged from the inlet 177a. Thus, the water advancing along the spray guidance surface 171 may be in a fast and compressed state. The water can be smoothly sprayed through the gasket nozzle 170 even when the water pressure is low.

More specifically, the spray guidance surface 171 is formed so that a width thereof is gradually widened from a start end to a finish end. And the inlet forming surface 177 is formed so that a width thereof is gradually widened from a start end to a finish end. When assuming that there exists a virtual connection surface formed as one plane which connects both lateral sides of the spray guidance surface 171 and the inlet forming surface 177, a protruding portion may be formed to protrude inside the gasket nozzle 170 from the virtual connection surface. In this case, the lateral flow of the water is limited corresponding to the length of the inner width of the gasket nozzle reduced by the protruding portion, and accordingly, the flow rate of the water is increased. Here, as can be seen with reference to FIGS. 9 and 10, the gasket nozzle 170 may have at least two surfaces 174 and 175 protruded inward from the virtual connection surface so as to form the protruding portion. Among these surfaces, a surface extended from the start end of the spray guidance surface 171 may be defined as the flow channel narrowing surface 174, and the other surfaces 175 are surfaces dependently formed for the purpose of connection between the flow channel narrowing surface 174 and the spray guidance surface 171 or the inlet forming surface 177.

Meanwhile, the flow channel narrowing surface 174 may be geometrically defined between two boundaries extended from the interval forming surface 173. A first boundary 174a is one extended while limiting the width of the spray guidance surface 171 from the point at which the interval forming surface 173 and the spray guidance surface 171 meet each other, and a second boundary 174b is one extended while gradually converging to the first boundary 174a from the point at which the interval forming surface 173 and the inlet forming surface 177 meet each other. In this case, the first boundary 174a may be extended from the start end of the spray guidance surface 171.

Meanwhile, the gasket nozzle 170 is protruded from the inside of the gasket 120. Outer curved surface portions 176 may be respectively formed at both outer ends of the gasket nozzle 170 in order to minimize damage of laundry when the laundry is rotated and bumped against the gasket nozzle 170. The outer curved surface portion 176 may have the smallest curvature value at a portion where the outer curved surface portion 176 meets the inner circumferential surface of the gasket 120.

The gasket 120 may be provided with a nozzle avoiding portion 127a forming a predetermined interval t between the nozzle avoiding portion 127a and the gasket nozzle 170 while avoiding the gasket nozzle 170. Although the gasket 120 is deformed in the vibration of the tub 132, it is possible to prevent deformation caused by compression between the gasket 120 and gasket nozzle 170 and a change in spray direction of the gasket nozzle 170 due to the deformation through the buffering effect caused by the interval t formed between the nozzle avoiding portion 127a and the gasket nozzle 170.

Meanwhile, since the advancing direction of the water flowed in through the inlet 177a is refracted while being bumped against the spray guidance surface 171, the water is guided in such a manner that the water is compressed while applying a predetermined positive pressure to the spray guidance surface 171. Thus, the spray of the water through the gasket nozzle 170 has the form of a water film basically having a remarkably thin thickness as compared with the width thereof.

However, when the water passes over the protrusions 172 formed on the spray guidance surface 171, the thickness of the water film is relatively thick between the protrusions 172, and the thickness of the water film is relatively thin at a peak portion of the protrusion 172. Hence, the final spray pattern of the water has a form in which a plurality of main spray flows with a strong intensity of water flow are connected by the thin water film due to the difference in thickness between the water films. The water sprayed in such a pattern can remove a contaminant adhered to laundry with a strong impact by the main spray flow, and the laundry is bent and stretched, thereby improving washing performance. Further, the spray area of water can be sufficiently ensured by the water film.

Figure 12:
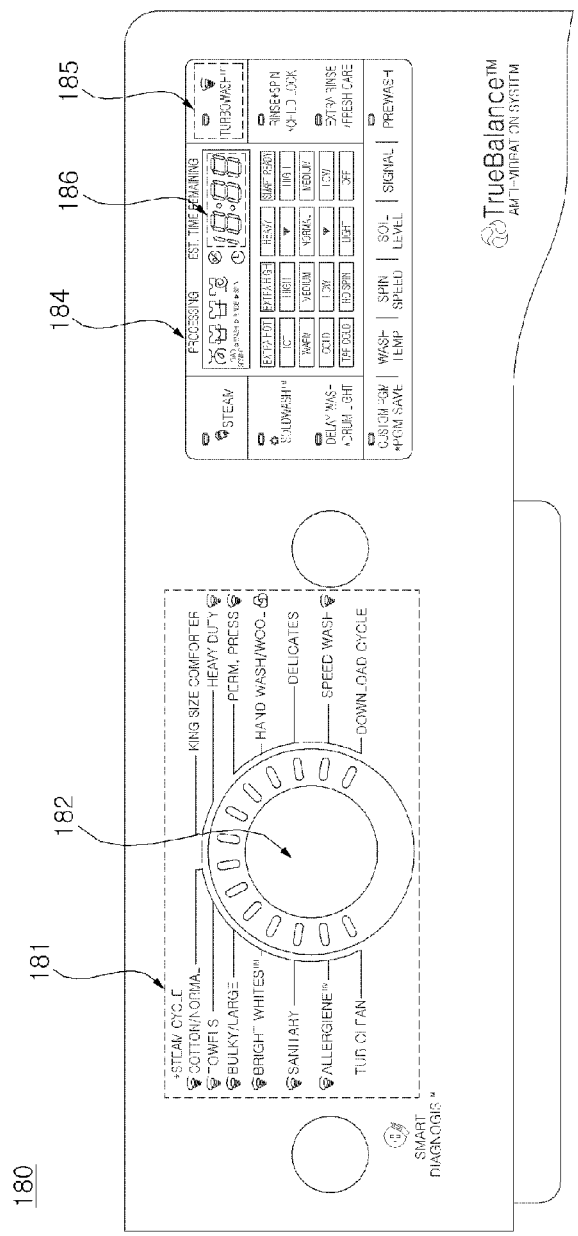
FIG. 12 illustrates an embodiment of a control panel.

FIG. 12 illustrates a control panel according to an embodiment of the present invention.

The control panel 180 is disposed at a front upper portion of the casing 110. The control panel 180 comprises a course selection unit 182 which allows a user to select a washing course, a course display unit 181 which displays selectable washing courses, and an input/output unit 184 which receives various operation commands input by the user, such as operation time for each cycle and reservation, and displays course information according to a user's course selection, information according to another command input by the user and an operation state in the operation of the washing machine.

The course selection unit 182 receives a washing course selected by the user. The course selection unit 182 may be formed using various types of input devices such as a button and a touch screen. In this embodiment, the course selection unit 182 is a knob.

The washing course is used to determine steps of each cycle throughout whole washing process according to the kind or function of laundry. In this embodiment, the washing course is divided into a COTTON/NORMAL course, a TOWELS course, a BULKY/LARGE course, a BRIGHT WHITE course, a SANITARY course, an ALLERGIENE course, a TUB CLEAN course, a HEAVY DUTY course, a PERM. PRESS course, a HAND WASH/WOOL course, a DELICATES course, a SPEED WASH course and a DOWNLOAD course.

Each course may be divided into a washing cycle, a rinsing cycle, a dewatering cycle, a complex cycle, etc. A step of water supply, washing, rinsing, drainage, dewatering, drying, etc. is performed in each cycle.

The course display unit 181 displays washing courses which can be selected by the user through the course selection unit 182. The course display unit 181 may be integrally formed with the course selection unit 182 so as to be implemented as a touch screen. In this embodiment, the course display unit 181 is displayed by being printed around the knob-shaped course selection unit 182.

In this embodiment, the COTTON/NORMAL course, the TOWELS course, the BULKY/LARGE course, the BRIGHT WHITE course, the SANITARY course, the ALLERGIENE course, the TUB CLEAN course, the HEAVY DUTY course, the PERM. PRESS course, the HAND WASH/WOOL course, the DELICATES course, the SPEED WASH course and the DOWNLOAD course are displayed in the course display unit 181.

The input/output unit 184 receives various kinds of commands input by the user, and various types of information are displayed in the input/output unit 184. The input/output unit 184 may be configured with a plurality of buttons and a screen or may be implemented as a touch screen. The input/output unit 184 comprises a washing time display unit 186 for displaying an expected washing time, and a turbo wash button 185 for setting turbo wash in which the laundry is washed by circulating water contained in the tub 132 and spraying the water into the drum 134 through the gasket nozzles 160 and 170 and/or turbo wash for performing turbo rinsing in which the laundry is rinsed by circulating water contained in the tub 132 and spraying the water into the drum 134 through the gasket nozzles 160 and 170 or turbo rinsing in which the laundry is rinsed by spraying the water into the drum 134 through the spiral nozzle 50 and 60 for transforming the water to a spiral flow.

The washing time display unit 186 displays an expected washing time before washing is started. The washing time display unit 186 displays an expected washing time according to a washing course input through the course selection unit 182. If the turbo wash is set through the turbo wash button 185, the washing time display unit 186 displays an expected washing time changed according to the turbo wash. The washing time display unit 186 displays a washing time remaining during the washing.

The turbo wash button 185 is a button through which the user sets the turbo wash. If the user presses the turbo wash button 185, the turbo wash is set. Then, if the user again presses the turbo wash button 185, the turbo wash is canceled so that general wash is set. If the turbo wash is set, the turbo wash button 185 emits light so as to display that the turbo wash has been set.

If the turbo wash is set, the washing time display unit 186 displays an expected washing time changed according to the turbo wash. If the turbo wash is performed, the expected washing time decreases in the same washing course. Thus, if the turbo wash is set, the expected washing time displayed in the washing time display unit 186 decreases. If the general wash is set due to the cancellation of the turbo wash, the expected washing time displayed in the washing time display unit 186 increases.

The turbo wash is used to perform turbo washing in which the laundry is washed by rotating the drum 134, circulating water mixed with a washing detergent and then spraying the water into the drum 134 through the gasket nozzles 160 and 170 in the selected washing course and/or turbo rinsing in the laundry is rinsed by rotating the drum 134, circulating water mixed with a rinsing detergent and then spraying the water into the drum 134 through the gasket nozzles 160 and 170. The turbo washing and turbo rinsing will be described in detail later with reference to FIG. 14.

The turbo wash is used to perform penetration rinsing in which the laundry is rinsed by rotating the drum 134 at a high speed so that the laundry is rotated while being adhered to the drum 134, transforming water not mixed with a detergent into a spiral flow and then spraying into the drum 134 through the spiral nozzle 50 and 60 in the selected washing course. The penetration rinsing will be described in detail later with reference to FIG. 14 penetration rinsing The turbo wash cannot be performed in all the washing courses. Therefore, the turbo wash cannot be set in some washing courses. The turbo wash may be basically set in a specific washing course, or may be basically canceled in another washing course.

A whirlwind-shaped turbo wash icon is displayed in the turbo wash button 185. The turbo wash icon is displayed next to the name of a washing course in which the turbo wash is selectable in the course display unit 181. That is, in the washing course having the turbo wash icon displayed next thereto in the course display unit 181, the turbo wash cannot be set.

The presence of setting of the turbo wash and the presence of basic setting of the turbo wash are shown in the following Table 1.

TABLE 1

| | | |
|---|---|---|
| Impossible to set turbo wash | | HAND WASH/WOOL course, DELICATES course |
| Possible to set turbo wash | Basic setting of turbo wash | COTTON/NORMAL course, PERM. PRESS course |
| | Basic cancellation of turbo wash | TOWELS course, BULKY/LARGE course, BRIGHT WHITE course, SANITARY course, ALLERGIENE course, TUB CLEAN course, HEAVY DUTY course, SPEED WASH course |

Referring to Table 1, the turbo wash is impossible in the HAND WASH/WOOL course or the DETAILS course. Therefore, in a case where the HAND WASH/WOOL course or the DETAILS course is selected in the course selection unit 182, the turbo washing is not set even though the user presses the turbo wash button 185.

The turbo wash can be set in the COTTON/NORMAL course or the PERM. PRESS course, and is basically set. Therefore, in a case where the COTTON/NORMAL course or the PERM. PRESS course is selected in the course selection unit 182, the turbo wash is basically set. If the user presses the turbo wash button 185, the turbo wash is canceled.

The turbo wash can be set in the TOWELS course, the BULKY/LARGE course, the BRIGHT WHITE course, the SANITARY course, the ALLERGIENE course, the TUB CLEAN course, the HEAVY DUTY course or the SPEED WASH course, and is basically canceled. Therefore, in a case where the TOWELS course, the BULKY/LARGE course, the BRIGHT WHITE course, the SANITARY course, the ALLERGIENE course, the TUB CLEAN course, the HEAVY DUTY course or the SPEED WASH course is selected in the course selection unit 182, the turbo wash is basically canceled. If the user presses the turbo wash button 185, the turbo wash is set.

In the DOWNLOAD course, the presence of possible setting of the turbo wash and the presence of basic setting of the turbo wash are determined according to a course downloaded from a network or peripheral device.

Figure 13:
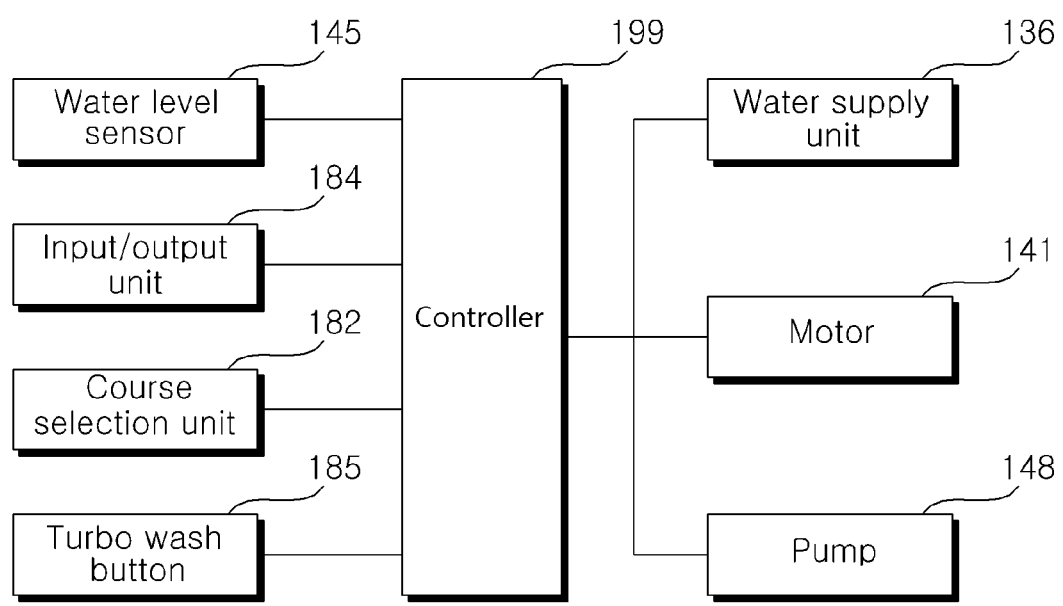
FIG. 13 is a block diagram of a washing machine according to an embodiment of the present invention.

FIG. 13 is a block diagram of a washing machine according to an embodiment of the present invention.

A water level sensor 145 senses a water level of water contained in the tub 132. The water level sensor 145 is a pressure sensor for sensing an air pressure in a water level sensing pipe (not shown) connected to the tub 132. The water level sensor 145 senses the water level of the water contained in the tub 132 from a sensed air pressure.

A controller 199 controls the entire operation of the washing machine under an operation command that the course selection unit 182 and/or the input/output unit 184 receives. The controller 199 is preferably provided in the control panel 180. The controller 199 may be configured with a microcomputer (MICOM) and other electronic components. The controller 199 determines the presence of progressing of each cycle, the presence of performing of operations such as water supply, washing, rinsing, drainage, dewatering, and drying in each cycle, time, repeated frequency, etc. according to the washing course selected through the course selection unit 182 and the presence of setting of the turbo wash through the turbo wash button 185.

The controller 199 controls the water supply unit 136, the motor 141 and the pump 148 according to the selected washing course or the presence of setting of the turbo wash.

Figure 14:
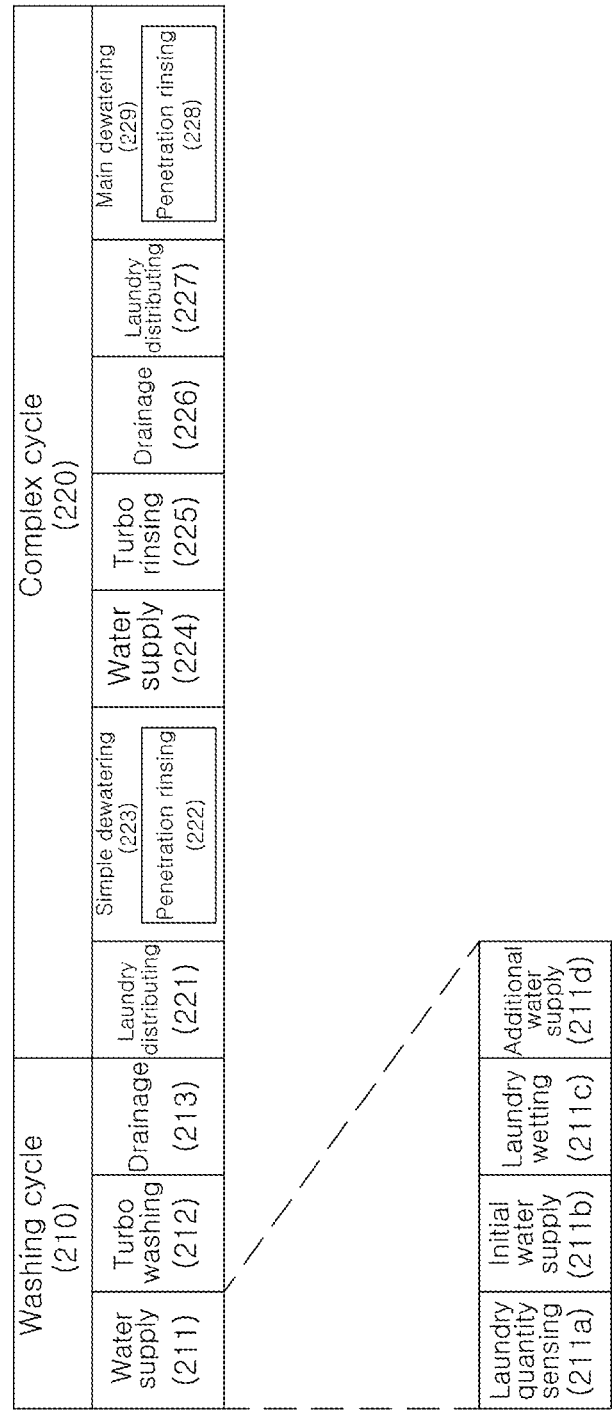
FIG. 14 illustrates whole cycles of a washing method according to an embodiment of the present invention.
Figure 15:
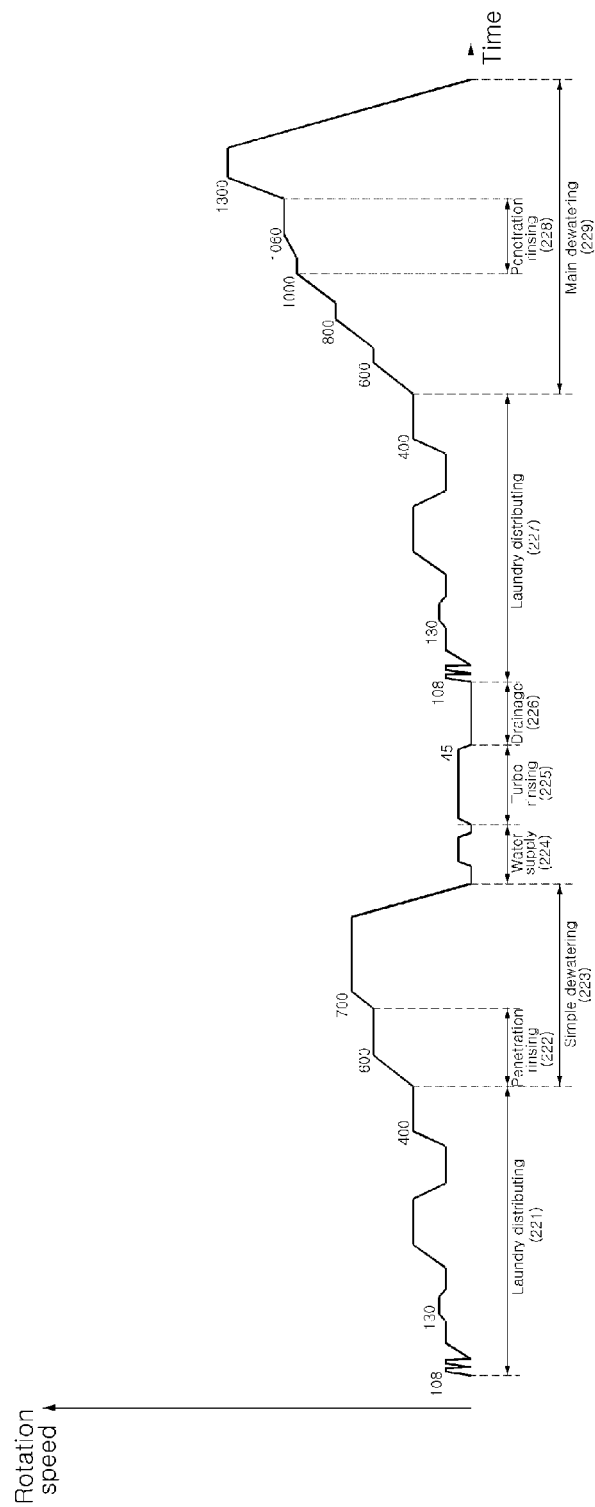
FIG. 15 illustrates rotation speeds of a drum in a complex cycle in the washing method shown in FIG. 14.

FIG. 14 illustrates whole cycles of a washing method according to an embodiment of the present invention. FIG. 15 illustrates rotation speeds of a drum in a complex cycle in the washing method shown in FIG. 14.

The washing method according to the embodiment of the present invention may be performed when a user sets the turbo wash through the course selection unit 182 and/or the turbo wash button 185. According to an embodiment, the general COTTON/NORMAL course may become the washing method described later.

A washing cycle 210 is a cycle in which a contaminant is removed from laundry by getting the laundry wet using water mixed with a washing detergent and then rotating the drum 134. In the washing method according to this embodiment, the washing cycle 20 comprises water supply 211, turbo washing 212 and drainage 213.

If the washing cycle 210 is started, the controller 199 informs the user that the washing cycle 210 is to be started by displaying a washing icon in the progress display of the input/output unit 184.

In the water supply 211, water is supplied into the tub 132 from an external water source. The water supply 211 comprises laundry quantity sensing 211a, initial water supply 211b, laundry wetting 211c and additional water supply 211d.

In the laundry quantity sensing 211a, the amount of the laundry (hereinafter, referred to as 'laundry quantity') received in the drum 134 is sensed. The laundry quantity may be sensed using various methods. In this embodiment, the laundry quantity is sensed using a method in which the controller 199 senses a deceleration time after the motor 141 rotates the drum 134 at a predetermined speed for a predetermined time.

As the deceleration time of the drum 134 increases, the level of the laundry quantity is increases. According to an embodiment, the controller 199 may compute the laundry quantity by sensing an acceleration time when the drum 134 is accelerated. The controller 199 determines the amount of water supplied into the tub 132 in the initial water supply 211b and the additional water supply 211d, and determines the amount of water sprayed into the drum 134 in the penetration rinsing 222 or 228. The controller 199 determines an operation time for each of the other cycles.

In the initial water supply 211b, the water mixed with the washing detergent is supplied into the tub 132, and the water not mixed with the detergent is supplied into the drum 134. In the initial water supply 211b, the water not mixed with the detergent may be supplied into the drum 134, and the water mixed with the washing detergent may be then supplied into the tub 132. The controller 199 opens the first water supply valve 136a of the water supply unit 136 so that the water is not mixed with the washing detergent in the detergent box 114 but flowed into the tub 132 through the water supply bellows 133.

Then, the controller 199 opens the second water supply valve 136b of the water supply unit 136 so that the water is mixed with the washing detergent in the detergent box 114 and then flowed into the tub 132 through the water supply bellows 133.

The supplying of the water into the tub 132 by opening the first water supply valve 136a in the initial water supply 211b may be divided into intermittent water supply and continuous water supply. In the intermittent water supply, water is supplied by intermittently opening the first water supply valve 136a. In the continuous water supply, water is supplied by continuously opening the first water supply valve 136a.

The controller 199 may determine the presence of progressing of the turbo wash by sensing a water pressure of the cold water source C.W, based on the time at which the water reaches a target water level in the continuous water supply. This will be described in detail later with reference to FIG. 16.

According to an embodiment, in the initial water supply 211b, the controller 199 opens the third water supply valve 136c so that the water not mixed with the washing detergent is sprayed into the drum 134 through the spiral nozzle 50 and 60. Then, the controller 199 opens the second water supply valve 136b so that the water is mixed with the washing detergent in the detergent box 114 and then flowed into the tub 132 through the water supply bellows 133.

In the initial water supply 211b, the hot water valve 136e of the water supply unit 136 is opened so that hot water is flowed into the tub 132.

The initial water supply 211b is performed until the water reaches a target water level. The target water level is determined by the controller 199 according to the laundry quantity sensed before the initial water supply 211b or selected course. In this embodiment, the target water level is set to a degree where water slightly ascends in the drum 134. In the laundry wetting 211c, the amount of water which can be circulated in the drum 134 is suitable for the target water level.

In the initial water supply 211b, the water level of water is preferably sensed by the water level sensor 145. If the water is flowed into the tub 132 up to the target water level, the controller 199 cuts off the valve of the water supply unit 136, thereby finishing the initial water supply 211b.

In the laundry wetting 211c, the controller 199 controls the drum 134 to be rotated by driving the motor 141 so that the laundry is evenly wet in the water mixed with the washing detergent and the washing detergent is resolved in the water. According to an embodiment, in the laundry wetting 211c, the controller 199 operates the pump 148, and the water is circulated along the circulation hoses 151 and 152, so that the water can be sprayed into the drum 134 through the gasket nozzles 160 and 170.

In the additional water supply 211d, as the target water level is lowered due to the laundry wet in the water, additional water is supplied into the drum. If the controller 199 opens the first water supply valve 131a, the second water supply valve 131b or various valves of the water supply unit 136 in the additional water supply 211d, the water can be supplied into the tub 132 from the external water source.

If the water is flowed into the tub 132 up to the target level, the controller 199 finishes the additional water supply 211d by cutting off the first water supply valve 131a, the second water supply valve 131b or various valves of the water supply unit 136.

In a case where the laundry is sufficiently wet in the initial water supply 211b, the water level is not lowered in the laundry wetting 211c. Therefore, the additional water supply 211d may be omitted.

In the turbo washing 212, the contaminant adhered to the laundry is removed by rotating the drum 134 containing the laundry, circulating the water mixed with the washing detergent and then spraying the water into the drum 134 through the gasket nozzles 160 and 170. In the turbo washing 212, the controller 199 controls the motor 141 to rotate the drum 134 at various speeds or in various directions so that the laundry is repetitively lifted and then drops. Accordingly, the contaminant adhered to the laundry is removed by applying, to the laundry, mechanical forces such as a bending and stretching force, a frictional force and a shock force. According to an embodiment, in a case where the drum 134 is rotated at 108 rpm or more, which is a speed at which the drum 134 is rotated in the state in which the laundry is attached thereto, laundry distributing described later may be performed before the turbo washing 212.

In order to prevent overheating of the motor 141 in the turbo washing 212, the controller 199 may control the driving of the motor 141 to be paused at an interval of a few seconds to a few minutes.

The turbo washing 212 is performed when the turbo wash is set by the user through the course selection unit 182 and/or the turbo wash button 185.

In the turbo washing 212, the controller 199 controls the pump 148 to be operated so that the water mixed with the washing detergent in the tub 132 is circulated along the circulation hoses 151 and 152 and then sprayed into the drum 134 through the gasket nozzles 160 and 170. In a case where the amount of the circulated water is too much, many bubbles may be generated. Therefore, the amount of the water is preferably set to a degree where the water can be circulated.

In a case where it is decided that the pump 148 is false in the turbo washing 212, the turbo wash is canceled, and general wash may be performed. This will be described in detail later with reference to FIG. 17.

In a case where the laundry quantity is no less than reference laundry quantity or the selected washing course is the HEAVY DUTY course in the turbo washing 212, the controller 199 operates the pump 148 when the motor 141 is stopped, so that it is possible to prevent overheating of the motor 141 and to reduce maximum power consumption. This will be described in detail later with reference to FIGS. 18 and 19.

In the turbo washing 212, the controller 199 may open the third water supply valve 131c of the water supply unit 136 so that the water is flowed in the fifth water supply hose 131g through the distributor, mixed with a bleach in the detergent box 114 and then flowed into the tub 132 through the water supply bellows 133. The supply of the bleach is performed until the water reaches a target water level. If the water mixed with the bleach is flowed into the tub 132 up to the target water level, the controller 199 cuts off the third water supply valve 131c of the water supply unit 136. The supply of the water mixed with the bleach is preferably performed as the last course of the turbo washing 212 just before the turbo washing 212 is finished.

In the drainage 213, the water in the tub 132 is drained to the outside of the tub 132. In the drainage 213, the controller 199 operates the pump 148 so that the water in the tub 132 is drained to the outside along the drainage hose 149. In the drainage 213, the drum 134 may be stopped, but may be rotated while maintaining the speed in the turbo washing 212.

In the washing cycle 210 described above, the turbo washing 212 may be performed as the general washing according to the setting of the turbo wash. In a case where the general wash is set as the turbo wash is canceled, the turbo washing 212 is performed as the general washing.

In the general washing, the controller 199 controls the motor 141 to rotate the drum 134. However, since the pump 148 is not operated, the water is not circulated. Accordingly, the water is not sprayed into the drum 134 through the gasket nozzles 160 and 170.

The complex cycle 220 is a cycle for removing the detergent remaining in the laundry and dewatering the laundry, in which rinsing and dewatering cycles are combined in the general washing method. The complex cycle 220 comprises laundry distributing 221, penetration rinsing 222, simple dewatering 223, water supply 224, turbo rinsing 225, drainage 226, laundry distributing 227, penetration rinsing 228 and main dewatering 229. If the complex cycle 220 is started, the controller 199 preferably displays a rinsing icon and/or a dewatering icon in the progress display of the input/output unit 184.

In the laundry distributing 221, the laundry is distributed by repeating a process of maintaining a constant speed of the drum 134 and then decelerating the drum after the drum 134 is accelerated. In the penetration rinsing 222 and/or the simple dewatering 223, there occurs a phenomenon that the laundry is biased to one side due to tangling of the laundry. Therefore, eccentricity in which one side of the drum 134 increases in weight about the center of the drum 134 may caused. Since the eccentricity of the laundry becomes a cause in which noise and vibration are generated in the high-speed rotation of the drum 134, the laundry is evenly distributed before the penetration rinsing 222 and/or the simple dewatering 223. The laundry distributing 221 is performed by repeating the process of maintaining a constant speed of the drum 134 and then decelerating the drum after the drum 134 is accelerated.

According to an embodiment, in the laundry distributing 221, the water may be sprayed toward the laundry through the gasket nozzles 160 and 170 or the spiral nozzle 50 and 60.

In the penetration rinsing 222, when the laundry is rotated by the rotation of the drum 134 while being attached to the drum 134, the remaining detergent and contaminant are removed by spraying the water not mixed with the detergent into the drum 134 through the spiral nozzle 50 and 60 so that the water passes through the laundry.

In the penetration rinsing 222, the controller 199 controls the motor 141 to rotate the drum 134 so that the laundry is adhered to the drum 134, and opens the third water supply valve 131c so that the water is sprayed into the drum 134 through the spiral nozzle 50 and 60. In this case, the controller 199 preferably operates the pump 148 so that the water in the tub 132 is drained to the outside along the drainage hose 149.

The penetration rinsing 222 is performed when the turbo wash is set by the user through the course selection unit 82 and/or the turbo wash button 185.

In the penetration rinsing 222, the drum 134 is rotated at a speed 1 G, i.e., 108 rpm or more, at which the laundry is rotated while being attached to the drum 134. In the penetration rinsing 222, the laundry is not preferably separated from the drum 134 while being attached to the drum 134. In this case, that the laundry is not separated from the drum 134 includes a meaning that a portion of the laundry is temporarily separated from in an exceptional situation, and means that most of the laundry is adhered to the drum 134 for most time.

In the penetration rinsing 222, the drum 134 is preferably maintained at a constant speed. According to an embodiment, the drum 134 may be accelerated. In this embodiment, in the penetration rinsing 222, the drum 134 is accelerated from 400 to 600 rpm and then maintains 600 rpm.

In the simple dewatering 223, the drum 134 is rotated at a high speed so that the water is separated from the laundry. The controller 199 closes the third water supply valve 131c after the penetration rinsing 222 so that the spray of the water is stopped, and consecutively rotates or accelerates the drum 134 at a speed or more, where the laundry is rotated while being attached to the drum 134, without decelerating or stopping the drum 134.

Hereinafter, the term "consecutively" means that the drum 134 is rotated without stopping between steps, and includes a meaning that the speed of the drum 134 is changed by being accelerated or decelerated.

In the simple dewatering 223, the laundry is not necessarily dewatered to a degree where the laundry is dried, and therefore, the drum 134 is preferably rotated at about 700 rpm. Preferably, in the simple dewatering 223, the controller 199 intermittently operates the pump 148 so that the water in the tub 132 is drained to the outside along the drainage hose 149.

The simple dewatering 223 is performed by accelerating the drum 134 with stopping or decelerating the drum 134 in the penetration rinsing 222, so that the laundry distributing is not separately performed between the penetration rinsing 222 and the simple dewatering 223. That is, the penetration rinsing 222 and the simple dewatering 223 are consecutively performed without the laundry distributing, so that it is possible to reduce the entire time and to minimize laundry damage.

According to an embodiment, the drum 134 is preferably maintained at a speed or more, where the laundry is rotated while being attached to the drum 134, so that the laundry distributing is unnecessary even though the drum 134 is decelerated between the penetration rinsing 222 and the simple dewatering 223. That is, the drum 134 is preferably rotated at a speed 1 G, i.e., 108 rpm or more, where the laundry is rotated while being attached to the drum 134 from the penetration rinsing 222 to the simple dewatering 223, so that the laundry is not separated from the drum 134 while being attached to the drum 134.

The penetration rinsing 222 described above is a process substantially performed in the simple dewatering 223. In the penetration rinsing 222, when the simple dewatering 223 is performed after the laundry distributing 221, the controller 199 opens the third water supply valve 131c so that the penetration rinsing 222 is performed while the water is sprayed into the drum 134 through the spiral nozzle 50 and 60. Thus, in a case where the turbo wash is set, the penetration rinsing 222 may be performed any time when the drum 134 is accelerated or maintains its speed during the simple dewatering. Alternatively, the penetration rinsing 222 may be divided into a plurality of sub-steps to be performed. That is, the penetration rinsing 222 may be performed any time not only before the simple dewatering 223 after the laundry distributing 221 but also in the middle of the simple dewatering 223.

However, the penetration rinsing 222 is not preferably performed at the end of the simple dewatering 223, and the simple dewatering 223 is necessarily resumed after the penetration rinsing 222.

In a case where the turbo wash is not set, the water is not sprayed into the drum 134 through the spiral nozzle 50 and 60 during the simple dewatering 223, and therefore, the penetration rinsing 222 is not performed.

Like the water supply 211 in the washing cycle 210 described above, the water is supplied into the tub 132 from the external water source in the water supply 224. The water supply 224 may comprise initial water supply, laundry wetting and additional water supply.

In the water supply 224, the controller 199 opens the first and second water supply valves 136a and 136b so that the water is mixed with a rinsing detergent in the detergent box 114 and then flowed into the tub 132 through the water supply bellows 133. The rinsing detergent is generally a fabric softener, but may include various functional detergents such as a detergent for generating incense.

According to an embodiment, in the water supply 224, the controller 199 may open the third water supply valve 136c so that the water not mixed with the washing detergent is sprayed into the drum 134 through the spiral nozzle 50 and 60.

In the water supply 224, the drum 134 is preferably stopped. However, the water supply 224 may be performed after the drum 134 is decelerated to a speed 1 G, i.e., 108 rpm or more, where the laundry is rotated while being attached to the drum 134.

In the turbo rinsing 225, the remaining detergent and contaminant of the laundry are removed by rotating the drum 134 containing the laundry, circulating the water mixed with the rinsing detergent and then spraying the water into the drum 134 through the gasket nozzles 160 and 170. In the turbo rinsing 225, the controller 199 controls the motor 141 to rotate the drum 134 at various speeds or in various directions so that the laundry is repetitively lifted and then drops. Thus, the remaining detergent and contaminant of the laundry is removed by applying, to the laundry, mechanical forces such as a bending and stretching force, a frictional force and a shock force. According to an embodiment, in a case where the drum 134 is rotated at 108 rpm or more, which is a speed at which the drum 134 is rotated in the state in which the laundry is attached thereto, laundry distributing described later may be performed before the turbo rinsing 225.

In order to prevent overheating of the motor 141 in the turbo rinsing 225, the controller 199 may control the driving of the motor 141 to be paused at an interval of a few seconds to a few minutes.

The turbo rinsing 225 is performed when the turbo wash is set by the user through the course selection unit 182 and/or the turbo wash button 185. In a case where the turbo wash is canceled so that the general wash is set, the turbo rinsing 225 is performed as general rinsing. In the general rinsing, the controller 199 controls the motor 141 to rotate the drum. However, since the pump 148 is not operated, the water is not circulated. Accordingly, the water is not sprayed into the drum 134 through the gasket nozzles 160 and 170.

In the turbo rinsing 225, the controller 199 operates the pump 148 so that the water mixed with the rinsing detergent in the tub 132 is circulated along the circulation hoses 151 and 152 and then sprayed into the drum 134 through the gasket nozzles 160 and 170. In a case where the amount of the circulated water is too much, many bubbles may be generated. Therefore, the amount of the water is preferably set to a degree where the water can be circulated.

In a case where it is decided that the pump 148 is false in the turbo rinsing 225, the turbo wash is canceled, and the general wash may be performed. This will be described in detail later with reference to FIG. 17.

In a case where the laundry quantity is no less than reference laundry quantity or the selected washing course is the HEAVY DUTY course in the turbo rinsing 225, the controller 199 operates the pump 148 when the motor 141 is stopped, so that it is possible to prevent overheating of the motor 141 and to reduce maximum power consumption. This will be described in detail later with reference to FIGS. 18 and 19.

Like the drainage 213 of the washing cycle 210 described above, the water in the tub 132 is drained to the outside in the drainage 226.

Accordingly to an embodiment, the water supply 224, the turbo rinsing 225 and the drainage 226 may be performed in another form or may be omitted. The water supply 224, the turbo rinsing 225 and the drainage 226 may be performed in the state in which the drum 134 is not stopped by being decelerated after the simple dewatering 223. In this case, the laundry distributing 227 may be omitted.

Like the laundry distributing 221 described above, the laundry is distributed by repeating a process of maintaining a constant speed of the drum 134 and then decelerating the drum after the drum 134 is accelerated in the laundry distributing 227. In the laundry distributing 227, the laundry is evenly distributed before the penetration rinsing 228 and/or the main dewatering 228. As shown in FIG. 15, the laundry distributing 227 is performed by repeating the process of maintaining a constant speed of the drum 134 and then decelerating the drum after the drum 134 is accelerated.

As described above, in the laundry distributing 227, the water can be sprayed toward the laundry through the gasket nozzles 160 and 170 or the spiral nozzle 50 and 60.

Like the penetration rinsing 222 described above, in the penetration rinsing 228, when the laundry is rotated by the rotation of the drum 134 while being attached to the drum 134, the remaining detergent and contaminant are removed by spraying the water not mixed with the detergent into the drum 134 through the spiral nozzle 50 and 60 so that the water passes through the laundry.

In the penetration rinsing 228, the controller 199 controls the motor 141 to rotate the drum 134 so that the laundry is adhered to the drum 134, and opens the third water supply valve 131c so that the water is sprayed into the drum 134 through the spiral nozzle 50 and 60. In this case, the controller 199 preferably operates the pump 148 so that the water in the tub 132 is drained to the outside along the drainage hose 149.

The penetration rinsing 228 is performed when the turbo washing is set by the user through the course selection unit 182 and/or the turbo wash button 185.

In the penetration rinsing 228, the drum 134 is rotated at a speed 1 G, i.e., 108 rpm or more, at which the laundry is rotated while being attached to the drum 134. In the penetration rinsing 228, the laundry is not preferably separated from the drum 134 while being attached to the drum 134.

In the penetration rinsing 228, the drum 134 is preferably maintained at a constant speed. According to an embodiment, the drum 134 may be accelerated. In this embodiment, in the penetration rinsing 227, the drum 134 maintains 1000 rpm and is then accelerated to 1060 rpm. Thereafter, the drum 134 maintains 1060 rpm.

Like the simple dewatering 223 described above, in the main dewatering 229, the drum 134 is rotated at a high speed so that the water is separated from the laundry. The controller 199 closes the third water supply valve 131c after the penetration rinsing 228 so that the spray of the water is stopped, and consecutively rotates or accelerates the drum 134 at a speed or more, where the laundry is rotated while being attached to the drum 134, without decelerating or stopping the drum 134.

In the main dewatering 229, the drum 134 is preferably rotated up to the maximum speed of 1000 rpm or more so that the laundry is dried to the maximum extent. In this embodiment, the drum 134 is rotated up to 1300 rpm. Preferably, in the main dewatering 229, the controller intermittently operates the pump 148 so that the water in the tub 132 is drained to the outside along the drainage hose 149.

The main dewatering 229 is performed by accelerating the drum 134 without stopping or decelerating the drum 134 in the penetration rinsing 228 so that the laundry distributing is not performed between the penetration rinsing 228 and the main dewatering 229. The penetration rinsing 228 and the main dewatering 229 are consecutively performed without the laundry distributing, so that it is possible to reduce the entire time and to minimize laundry damage.

According to an embodiment, the drum 134 is preferably maintained at a speed or more, where the laundry is rotated while being attached to the drum 134, so that the laundry distributing is unnecessary even though the drum 134 is decelerated between the penetration rinsing 228 and the main dewatering 229. That is, the drum 134 is preferably rotated at a speed 1 G, i.e., 108 rpm or more, where the laundry is rotated while being attached to the drum 134 from the penetration rinsing 228 to the main dewatering 229, so that the laundry is not separated from the drum 134 while being attached to the drum 134.

The penetration rinsing 228 described above is a process substantially performed in the main dewatering 229. In the penetration rinsing 228, when the main dewatering 229 is performed after the laundry distributing 227, the controller 199 opens the third water supply valve 131c so that the penetration rinsing 228 is performed while the water is sprayed into the drum 134 through the spiral nozzle 50 and 60. Thus, in a case where the turbo wash is set, the penetration rinsing 228 may be performed any time when the drum 134 is accelerated or maintains its speed during the simple dewatering. Alternatively, the penetration rinsing 222 may be divided into a plurality of sub-steps to be performed. That is, the penetration rinsing 228 may be performed any time not only before the main dewatering 229 after the laundry distributing 227 but also in the middle of the main dewatering 229.

However, the penetration rinsing 228 is not preferably performed at the end of the main dewatering 229, and the main dewatering 229 is necessarily resumed after the penetration rinsing 228.

In a case where the turbo wash is not set, the water is not sprayed into the drum 134 through the spiral nozzle 50 and 60 during the main dewatering 229, and therefore, the penetration rinsing 228 is not performed.

Drying in which the laundry is dried by supplying hot wind into the drum 134 may be performed after the main dewatering 229.

Each step of the complex cycle 220 may be modified or omitted.

Figure 16:
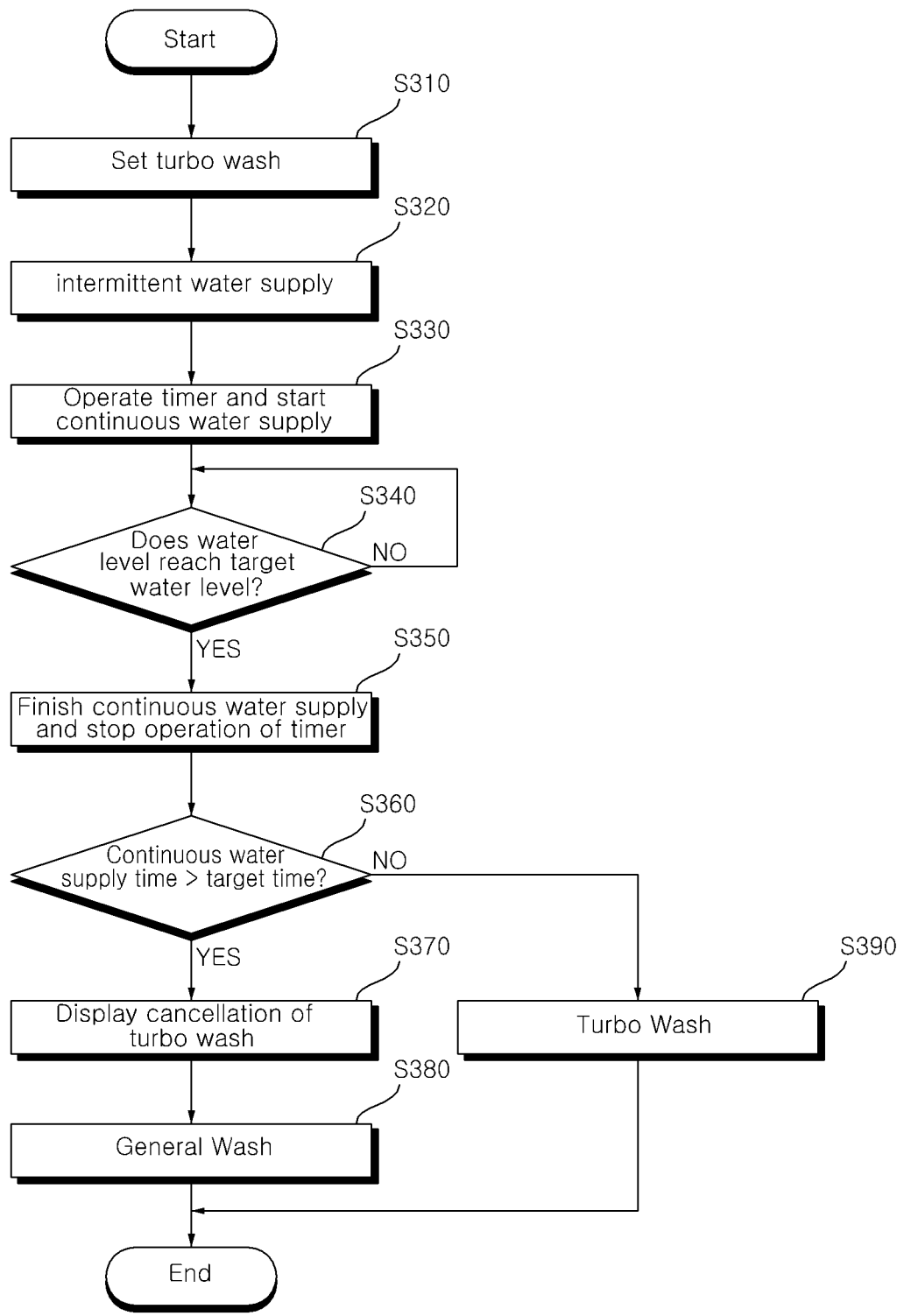
FIG. 16 is a flowchart illustrating a water pressure measuring method in the washing method according to an embodiment of the present invention.

FIG. 16 is a flowchart illustrating a water pressure measuring method in the washing method according to an embodiment of the present invention.

A user sets turbo wash through the course selection unit 182 and/or the turbo wash button 185 (S310). The turbo wash is used to perform turbo washing in which the laundry is washed by rotating the drum 134, circulating water mixed with a washing detergent and then spraying the water into the drum 134 through the gasket nozzles 160 and 170 in the selected washing course and/or turbo rinsing in the laundry is rinsed by rotating the drum 134, circulating water mixed with a rinsing detergent and then spraying the water into the drum 134 through the gasket nozzles 160 and 170.

The turbo wash is used to perform penetration rinsing in which laundry is rinsed by spraying water not mixed with a detergent into the drum 134 through the spiral nozzle 50 and 60 when the laundry is rotated while being attached to the drum by rotating the drum 134 in the selected washing course.

If washing is started after the turbo wash is set, the washing cycle 210 is started so that the controller 199 performs the water supply 211. If the water supply 211 is started, the laundry quantity sensing 211a is performed, and the initial water supply 211b is then performed.

If the controller 199 intermittently opens the first water supply valve 136a in the initial water supply 211b, intermittent water supply in which the water is flowed into the tub 132 through the water supply bellows 133 is performed (S320). In this embodiment, the intermittent water supply is performed six times at an interval of 0.3 second.

After the intermittent water supply, the controller 199 integrates time by operating a timer, and opens the first water supply valve 136a so that continuous water supply in which the water is supplied into the tub 132 through the water supply bellows 133 is started (S330).

The timer is a time integrator included in the controller 199, and the operation of the timer is started together with the starting of the continuous water supply. If the continuous water supply is started, the water in the tub 132 is supplied.

The controller 199 decides whether the water level of water contained in the tub 132, sensed by the water level sensor, reaches a target water level (S340). In a case where the water level of the water does not reach the target water level, the controller 199 continuously performs the continuous water supply so that the time is continuously integrated by the timer.

In a case where the water level of the water reaches the target water level, the controller 199 finishes the continuous water supply and stops the operation of the timer (S350). In a case where the water level of the water reaches the target water level, the controller 199 closes the first water supply valve 136a, and computes the integrated time by stopping the operation of the timer.

The controller 199 decides whether the continuous water supply time integrated by the timer, is greater than a target time (S360). The controller 199 compares, with the target time, the continuous water supply time that is a time taken until the water level of the water in the tub 132 reaches the target water level through the continuous water supply.

In a case where the continuous water supply time is not greater than the target time, the controller 199 decides that the water pressure of the cold water source C.W is normal, and performs turbo wash (S390). In a case where the continuous water supply time is not greater than the target time, the controller 199 performs the turbo washing 212 in the washing cycle 210, and performs the penetration rinsing 222 and 228 and the turbo rinsing 225 in the complex cycle 220.

In a case where the continuous water supply time is greater than the target time, the controller 199 decides that the water pressure of the cold water source C.W is low, and displays the cancellation of the turbo wash to the outside (S370). In a case where the continuous water supply time is greater than the target time, the controller 199 cancels the turbo wash, and displays the cancellation of the turbo wash in the input/output unit 184 or flickers the light of the turbo wash button 185 several times and then turns off the light of the turbo wash button 185.

Figure 17:
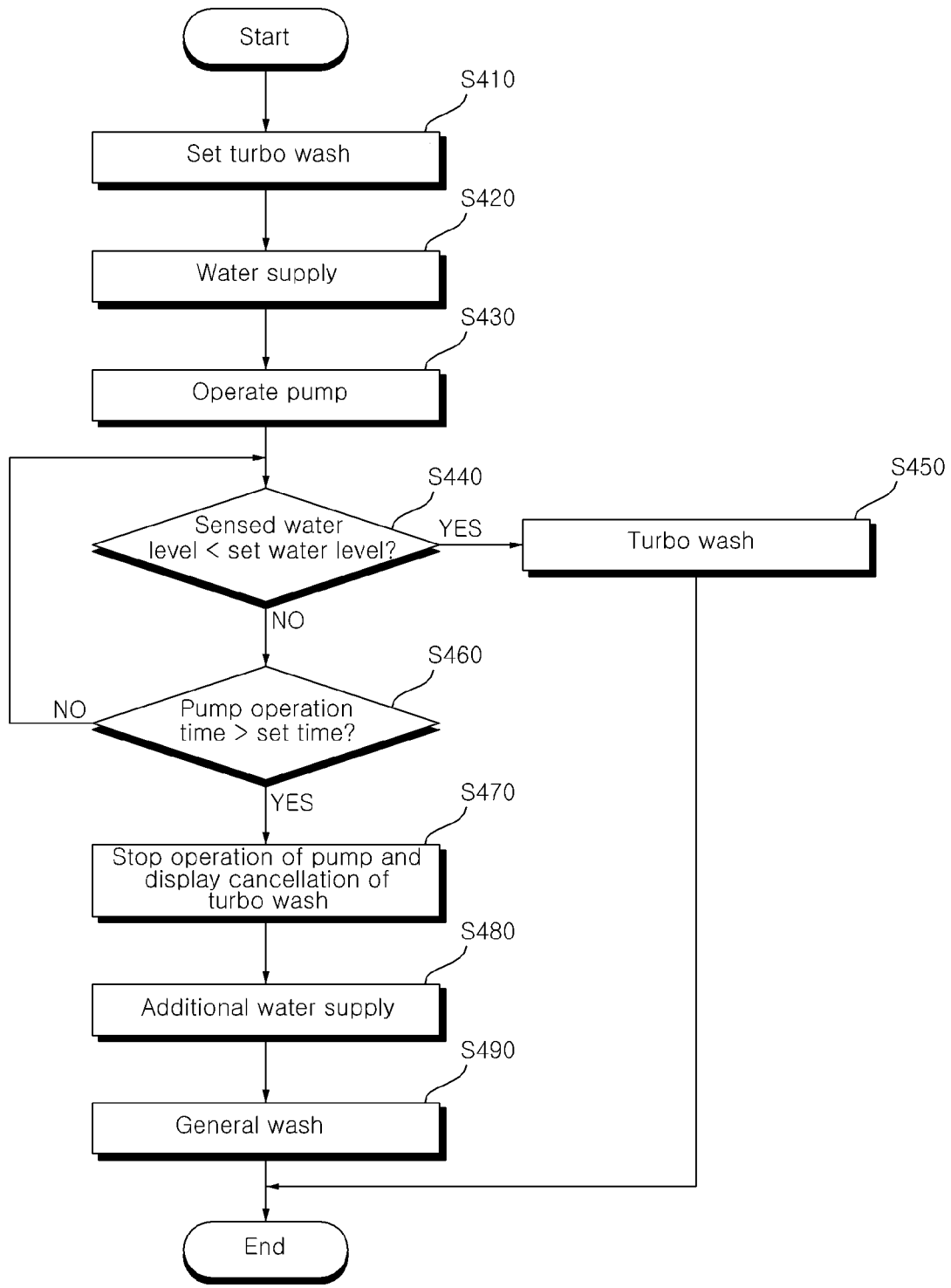
FIG. 17 is a flowchart illustrating a pump fault determining method in the washing method according to an embodiment of the present invention.

After the turbo wash is canceled, the controller 199 performs general wash (S380). The controller 199 performs the general washing in the washing cycle 210. The controller 199 does not perform the penetration rinsing 222 and 228, and performs the general rinsing.penetration rinsing FIG. 17 is a flowchart illustrating a pump fault determining method in the washing method according to an embodiment of the present invention.

A user sets turbo wash through the course selection unit 182 and/or the turbo wash button 185 (S410). The turbo wash is used to perform turbo washing in which the laundry is washed by rotating the drum 134, circulating water mixed with a washing detergent and then spraying the water into the drum 134 through the gasket nozzles 160 and 170 in the selected washing course and/or turbo rinsing in the laundry is rinsed by rotating the drum 134, circulating water mixed with a rinsing detergent and then spraying the water into the drum 134 through the gasket nozzles 160 and 170.

The turbo wash is used to perform penetration rinsing in which laundry is rinsed by spraying water not mixed with a detergent into the drum 134 through the spiral nozzle 50 and 60 when the laundry is rotated while being attached to the drum by rotating the drum 134 in the selected washing course.

If washing is started after the turbo wash is set, the washing cycle 210 is started so that the controller 199 performs the water supply 211 (S420). In the water supply 211, water is supplied into the tub 132 from an external water source. In the water supply 211, the controller 199 opens various valves of the water supply unit 136 including the first or second water supply valve 131a or 131b, etc. so that the water supplied from the external water source is supplied into the tub 132 through the water supply bellows 133.

If the water supply 211 is finished, the turbo washing 212 is performed. Then, the controller 199 operates the pump 148 to circulate the water (S430). If the pump 148 is operated, the water mixed with a washing detergent in the tub 132 is circulated along the circulation hoses 151 and 152, and then sprayed into the drum 134 through the gasket nozzles 160 and 170.

When the pump 148 is operated, the controller 199 decides whether the water level of the water contained in the tub 132, sensed by the water level sensor 145, is lower than a set water level (S440). If the pump 148 is operated to circulate the water, a certain amount of the water is stored in the circulation hoses 151 and 152, and therefore, the water level of the water stored in the tub 132 is lowered. Thus, the controller 199 decides whether the pump 148 is false by comparing, with the set water level, the water level of the water contained in the tub 132, sensed by the water level sensor 145 in the operation of the pump 148.

If the sensed water level is lower than the set water level, the controller 199 decides that the pump 148 is normally operated, and performs turbo wash (S450). If the sensed water level is lower than the set water level, the controller 199 performs the turbo washing 212. The controller 199 performs the penetration rinsing 222 and 228 and the turbo rinsing 225 in the complex cycle 220.

If the sensed water level is not lower than the set water level, the controller 199 decides that the pump 148 is false. Then, the controller 199 stops the operation of the pump 148 and displays the cancellation of the turbo wash. If the sensed water level is lower than the set water level, the controller 199 stops the operation of the pump 148. The controller 199 cancels the turbo wash, and displays the cancellation of the turbo wash in the input/output unit 184 or flickers the light of the turbo wash button 185 several times and then turns off the light of the turbo wash button 185.

The controller 199 performs additional water supply (S480). Since water is further needed in the general wash than in the turbo wash, the controller 199 opens various valves of the water supply unit 136 including the first or second water supply valve 131a or 131b, etc. so that the water supplied from the external water source is supplied into the tub 132 through the water supply bellows 133.

If the additional water supply is finished, the controller 199 performs general wash (S490). The controller 199 performs the general washing. The controller 199 does not perform the penetration rinsing 222 and 228 in the complex cycle 220, and performs general rinsing.

The washing method described above has been described, based on the water supply 211 and the turbo washing 212 in the washing cycle 210, but may be applied to the water supply 224 and the turbo rinsing 225 in the complex cycle 220.

Figure 18:
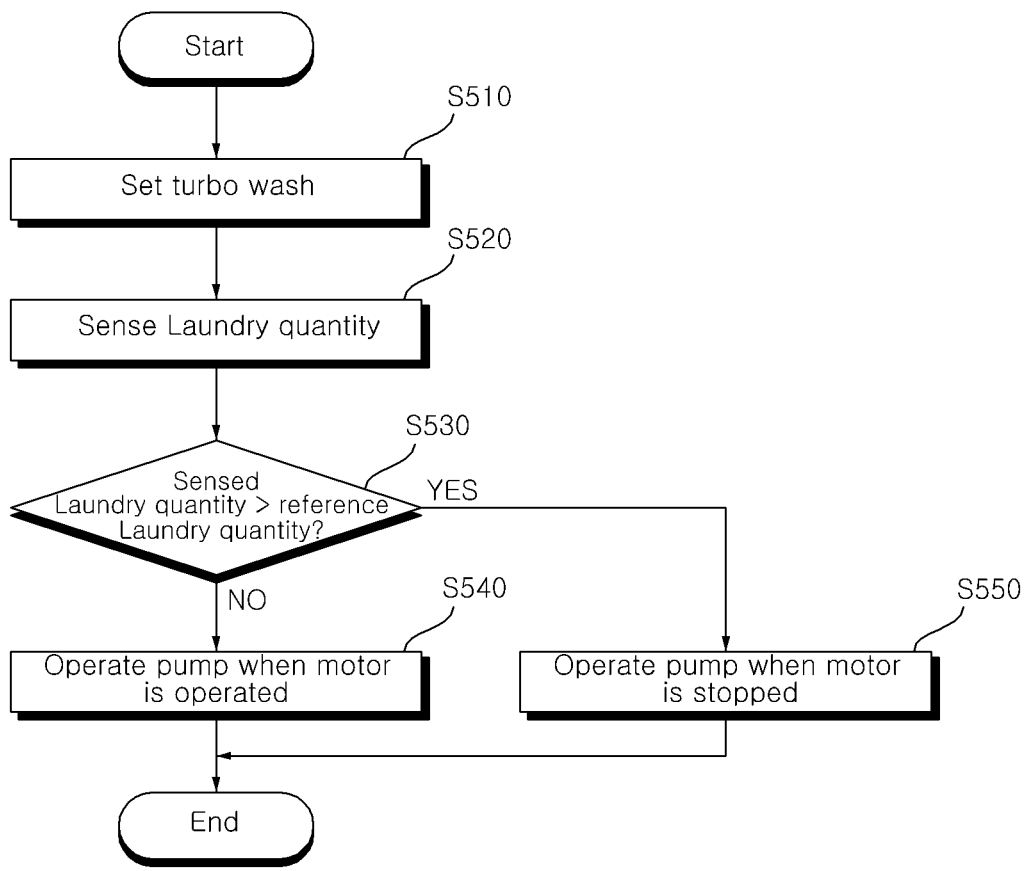
FIG. 18 is a flowchart illustrating a pump operating method in the washing method according to an embodiment of the present invention.

FIG. 18 is a flowchart illustrating a pump operating method in the washing method according to an embodiment of the present invention.

A user sets turbo wash through the course selection unit 182 and/or the turbo wash button 185 (S510). The turbo washing is used to perform turbo wash in which the laundry is washed by rotating the drum 134, circulating water mixed with a washing detergent and then spraying the water into the drum 134 through the gasket nozzles 160 and 170 in the selected washing course and/or turbo rinsing in the laundry is rinsed by rotating the drum 134, circulating water mixed with a rinsing detergent and then spraying the water into the drum 134 through the gasket nozzles 160 and 170.

The turbo wash is used to perform penetration rinsing in which laundry is rinsed by spraying water not mixed with a detergent into the drum 134 through the spiral nozzle 50 and 60 when the laundry is rotated while being attached to the drum by rotating the drum 134 in the selected washing course.

If washing is started after the turbo wash is set, the washing cycle 210 is started so that the controller 199 performs the water supply 211 (S520). In the laundry quantity sensing 211a, the laundry quantity that is an amount of laundry received in the drum 134 is sensed. The controller 199 controls the motor 141 to rotate the drum 134 at a predetermined speed for a predetermined time and then brake the drum 134. Thus, the laundry quantity is sensed by measuring a decelerating time.

The controller 199 decides whether the sensed laundry quantity is greater than reference laundry quantity (S530). The controller 199 performs the laundry quantity sensing 211a and then compares the sensed laundry quantity with the reference laundry quantity.

In a case where the sensed laundry quantity is not greater than the reference laundry quantity, the controller 199 operates the pump 148 when the motor 141 is operated in the turbo washing 212 or the turbo rinsing 225 so that the water is circulated (S540). In the turbo washing 212 or the turbo rinsing 225, the controller 199 operates the pump 148 when the drum 134 is rotated under the operation of the motor 141 so that the water in the tub 132 is circulated along the circulation hoses 151 and 152 and then sprayed into the drum 134 through the gasket nozzles 160 and 170.

In a case where the sensed laundry quantity is greater than the reference laundry quantity, the controller 199 operates the pump 148 when the motor 141 is stopped so that the water is circulated (S550). In a case where the sensed laundry quantity is greater than the reference laundry quantity, the motor 141 may be overheated, and therefore, power consumption is also increased. Thus, in the turbo washing 212 or the turbo rinsing 225, the controller 199 stops the motor 141 and operates the pump 148 so that when the drum 134 is decelerated or stopped, the water in the tub 132 is circulated along the circulation hoses 151 and 152 and then sprayed into the drum 134 through the gasket nozzles 160 and 170. In this case, although the washing or rinsing performance is slightly lowered, it is possible to prevent overheating and to reduce the maximum power consumption.

Figure 19:
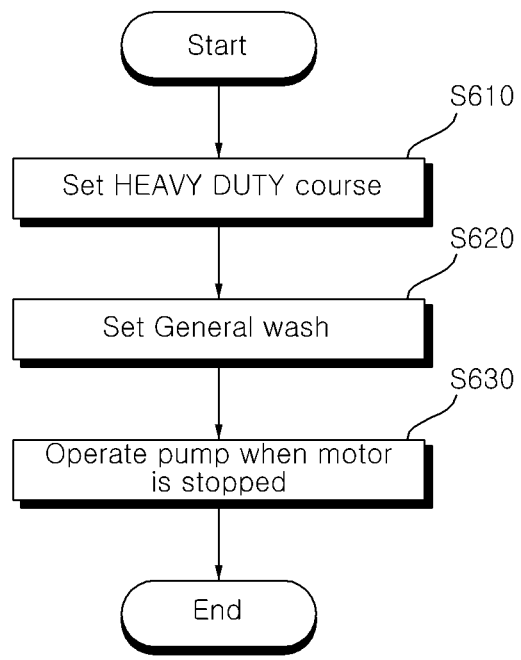
FIG. 19 is a flowchart illustrating a washing method of a HEAVY DUTY course in the washing method according to an embodiment of the present invention.

FIG. 19 is a flowchart illustrating a washing method of a HEAVY DUTY course in the washing method according to an embodiment of the present invention.

If a user a HEAVY DUTY course through the course selection unit 182, the HEAVY DUTY course is set (S610). The HEAVY DUTY course may be selected when the amount of laundry is large or the contamination of the laundry is serious.

If the HEAVY DUTY course is set, the turbo wash is basically canceled as described above.

The turbo washing is canceled, and general wash is set (S620). In a case where the user start washing while maintaining the general wash that is a basic setting of the HEAVY DUTY course, the turbo wash is canceled, and the general wash is set.

In a case where the turbo washing is canceled and the general wash is set in the HEAVY DUTY course, the controller 199 operates the pump 148 when the motor 141 is stopped in the washing or the rinsing so that the water is circulated (S630).

In the general wash, the general washing instead of the turbo washing 212 is performed in another washing course, and the general rinsing instead of the turbo rinsing 225 is performed. However, in the HEAVY DUTY course, the turbo washing 212 and/or the turbo rinsing 225 are/is performed. In this case, the penetration rinsing 222 and 228 are not performed.

Since the HEAVY DUTY course requires strong washing and rinsing performance, the turbo washing 212 and/or the turbo rinsing 225 are/is preferably performed even when the user sets the general wash. However, in order to prevent overheating and reduce the maximum power consumption, in the turbo washing 212 or the turbo rinsing 225, the controller 199 stops the motor 141 and operates the pump 148 so that when the drum 134 is decelerated or stopped, the water in the tub 132 is circulated along the circulation hoses 151 and 152 and then sprayed into the drum 134 through the gasket nozzles 160 and 170.

Although the preferred embodiment and other embodiments of the method for preparing high-purity alumina according to the present invention has been explained in detail with reference to the accompanying drawings. However, the embodiments of the present invention are not limited thereto, and it will be apparent that various modifications and other embodiments are possible within the scope of the invention. Accordingly, the substantial scope of the invention shall be determined only by the appended claims and their equivalents.

The invention claimed is:

1. A washing machine comprising:
    a casing;
    a tub disposed inside the casing;
    a drum rotatably provided inside the tub, for accommodating laundry therein;
    a spiral nozzle for rotating supplied water in a predetermined direction and then spraying the water into the drum, the spiral nozzle comprising:
        a flow channel forming pipe for forming a channel along which the supplied water flows,
        a spiral nozzle cap having a discharge hole through which the water flowed through the flow channel forming pipe is discharged, and
        at least one vane for guiding the water to advance toward the discharge hole while being rotated in the predetermined direction in the flow channel forming pipe; and
    an impingement surface formed in front of the discharge hole so that the water discharged from the discharge hole is distributed by impinging on the impingement surface, the impingement surface comprising first and second descent guidance surfaces extended to be laterally downwardly inclined in opposite directions from each other, the second descent guidance surface configured such that water along the second descent guidance surface, having greater flow rate as compared with the first descent guidance surface, is guided according to the rotation direction of the vane, wherein a gradient along a downward inclination of the first descent guidance surface being larger than a gradient along a downward inclination of the second descent guidance surface, and wherein the spiral nozzle further comprises a barrier formed on the second descent guidance surface, for limiting flow of water in lateral direction along the second descent guidance surface.

2. The washing machine of claim 1, wherein the first and second descent guidance surfaces form a curved contour.

3. The washing machine of claim 1, further comprising:
a gasket interposed between the casing and the tub, for preventing water in the tub from leaking between the tub and the casing,
wherein the spiral nozzle is fixed at a position biased to one side about a vertical center line of the gasket.

4. The washing machine of claim 3, further comprising:
a steam nozzle for spraying steam into the drum,
wherein the steam nozzle is fixed on the vertical center line of the gasket.

5. The washing machine of claim 1, wherein the spiral nozzle further comprises a vane shaft extended from a center of the flow channel forming pipe, and the vane connects between the vane shaft and the flow channel forming pipe.

6. The washing machine of claim 5, wherein the vane is extended smaller than an entire length of the flow channel forming pipe along a longitudinal direction of the vane shaft, and a finish end of the vane, at which a rotation of water flow is finished, is extended up to an end of the flow channel forming pipe.

7. The washing machine of claim 5, wherein a boundary between an inner side of the vane and the vane shaft and a boundary between an outer side of the vane and the flow channel forming pipe form a pair of spirals parallel with each other.

8. The washing machine of claim 5, wherein the vane is provided plural, and flow channels respectively formed by the plurality of vanes do not overlap with one another in the flow channel forming pipe.

9. The washing machine of claim 8, wherein the plurality of vanes comprise first and second vanes, a start end of the first vane and a finish end of the second vane are spaced apart from each other when being viewed in a longitudinal direction of the vane shaft, and a finish end of the first vane and a start end of the second vane are spaced apart from each other when being viewed in the length direction of the vane shaft.

10. The washing machine of claim 9, wherein a rotation angle from the start end to the finish end of any one of the first and second vanes is smaller than a value obtained by subtracting a rotation angle from the start end to the finish end of the other of the first and second vanes from 360 degrees.

11. The washing machine of claim 10, wherein the rotation angle of each of the first and second vanes is less than 180 degrees.

12. The washing machine of claim 5, wherein a finish end of the vane forms a predetermined angle with the discharge hole about the vane shaft.

13. The washing machine of claim 1, wherein the flow channel forming pipe and the spiral nozzle are formed with separate members to be coupled to each other.

14. The washing machine of claim 1, further comprising a water supply hose connected to an external water source, wherein the spiral nozzle sprays water supplied through the water supply hose.

15. The washing machine of claim 1, wherein the water sprayed through the spiral nozzle reaches a posterior wall of the drum.

* * * * *